US012180864B2

(12) United States Patent
Takenaka

(10) Patent No.: US 12,180,864 B2
(45) Date of Patent: Dec. 31, 2024

(54) VALVE TIMING ADJUSTMENT SYSTEM AND ELECTRONIC CONTROL DEVICE

(71) Applicant: DENSO CORPORATION, Kariya (JP)

(72) Inventor: Kenichiro Takenaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/425,285

(22) Filed: Jan. 29, 2024

(65) Prior Publication Data

US 2024/0167399 A1 May 23, 2024

Related U.S. Application Data

(63) Continuation of application No. PCT/JP2022/027450, filed on Jul. 12, 2022.

(30) Foreign Application Priority Data

Jul. 30, 2021 (JP) ................................ 2021-125507

(51) Int. Cl.

*F01L 1/344* (2006.01)
*F02D 13/02* (2006.01)
*F02D 41/20* (2006.01)

(52) U.S. Cl.

CPC ........ *F01L 1/3442* (2013.01); *F02D 13/0215* (2013.01); *F02D 41/20* (2013.01); *F01L 2001/34426* (2013.01); *F01L 2001/34456* (2013.01)

(58) Field of Classification Search

CPC ........... F01L 1/3442; F01L 2001/34426; F01L 2001/34456

See application file for complete search history.

(56) References Cited

U.S. PATENT DOCUMENTS

| | | | | |
|---|---|---|---|---|
| 10,612,431 | B2 | 4/2020 | Mlinaric | |
| 2005/0098130 | A1 | 5/2005 | Hirowatari | |
| 2010/0269772 | A1 * | 10/2010 | Takemura | F01L 1/3442 123/90.17 |
| 2018/0252123 | A1 | 9/2018 | Mlinaric | |
| 2018/0298815 | A1 | 10/2018 | Moon | |

FOREIGN PATENT DOCUMENTS

| | | |
|---|---|---|
| DE | 10 2004 048 070 | 6/2006 |
| EP | 1 531 248 | 5/2005 |

* cited by examiner

*Primary Examiner* — Ngoc T Nguyen

(74) *Attorney, Agent, or Firm* — Nixon & Vanderhye P.C.

(57) ABSTRACT

A valve timing adjustment system includes a valve timing adjustment device, a phase lock mechanism, a hydraulic control valve, an electromagnetic drive section, and an electronic control device. When the lock pin included in the phase lock mechanism and having the tip thereof fitted into a fitting recess is removed from the fitting recess, the electronic control device performs an initial control of applying current to the electromagnetic drive section at a prescribed current value for a prescribed time to move a spool of the hydraulic control valve from an initial position. Thereafter, the electronic control device performs a gradual change control of applying current to the electromagnetic drive section while gradually increasing the current value from a current value smaller than the current value applied in the initial control but greater than 0, to remove the lock pin from the fitting recess.

14 Claims, 12 Drawing Sheets

VALVE TIMING ADJUSTMENT SYSTEM AND ELECTRONIC CONTROL DEVICE

CROSS-REFERENCE TO RELATED APPLICATIONS

This application is the U.S. bypass application of International Application No. PCT/JP2022/027450 filed on Jul. 12, 2022, which designated the U.S. and claims priority to Japanese Patent Application No. 2021-125507 filed on Jul. 30, 2021, the contents of which is incorporated herein by reference.

BACKGROUND

Technical Field

The present disclosure relates to a valve timing adjustment system and an electronic control device that controls the drive of the valve timing adjustment system.

Description of the Related Art

Valve timing adjustment systems have conventionally been known that adjust the opening or closing timing of an intake valve or an exhaust valve of an internal combustion engine.

For example, a valve timing adjustment system described in conventional art includes a valve timing adjustment device, a phase lock mechanism, a fluid pressure control device and an electronic control device, and the like. The valve timing adjustment device includes a housing that rotates together with a drive shaft of an internal combustion engine, and a vane rotor that partitions a hydraulic chamber formed in the housing into an advance hydraulic chamber and a retard hydraulic chamber, and that rotates together with a driven shaft of the internal combustion engine. The phase lock mechanism is configured to lock the relative rotation of the vane rotor and the housing by fitting, into a fitting recess of the housing, the tip of a lock pin disposed in a receiving hole of the vane rotor in a reciprocable manner. The fluid pressure control device includes a hydraulic control valve and an electromagnetic drive section that are integrally formed, the hydraulic control valve including a spool and a sleeve, and the electromagnetic drive section moving the spool in the shaft direction, and the fluid pressure control device supplies hydraulic pressure to the hydraulic chamber of the valve timing adjustment device.

SUMMARY

According to one aspect of the present disclosure, a valve timing adjustment system is disposed in a torque transmission system for transmitting torque from a drive shaft of an internal combustion engine to a driven shaft and adjusts opening or closing timing of an intake valve or an exhaust valve driven to be open or closed by rotation of the driven shaft, and the valve timing adjustment system includes a valve timing adjustment device, a phase lock mechanism, a hydraulic control valve, an electromagnetic drive section, and an electronic control device.

DETAILED DESCRIPTION OF THE PREFERRED EMBODIMENTS

Figure 1:
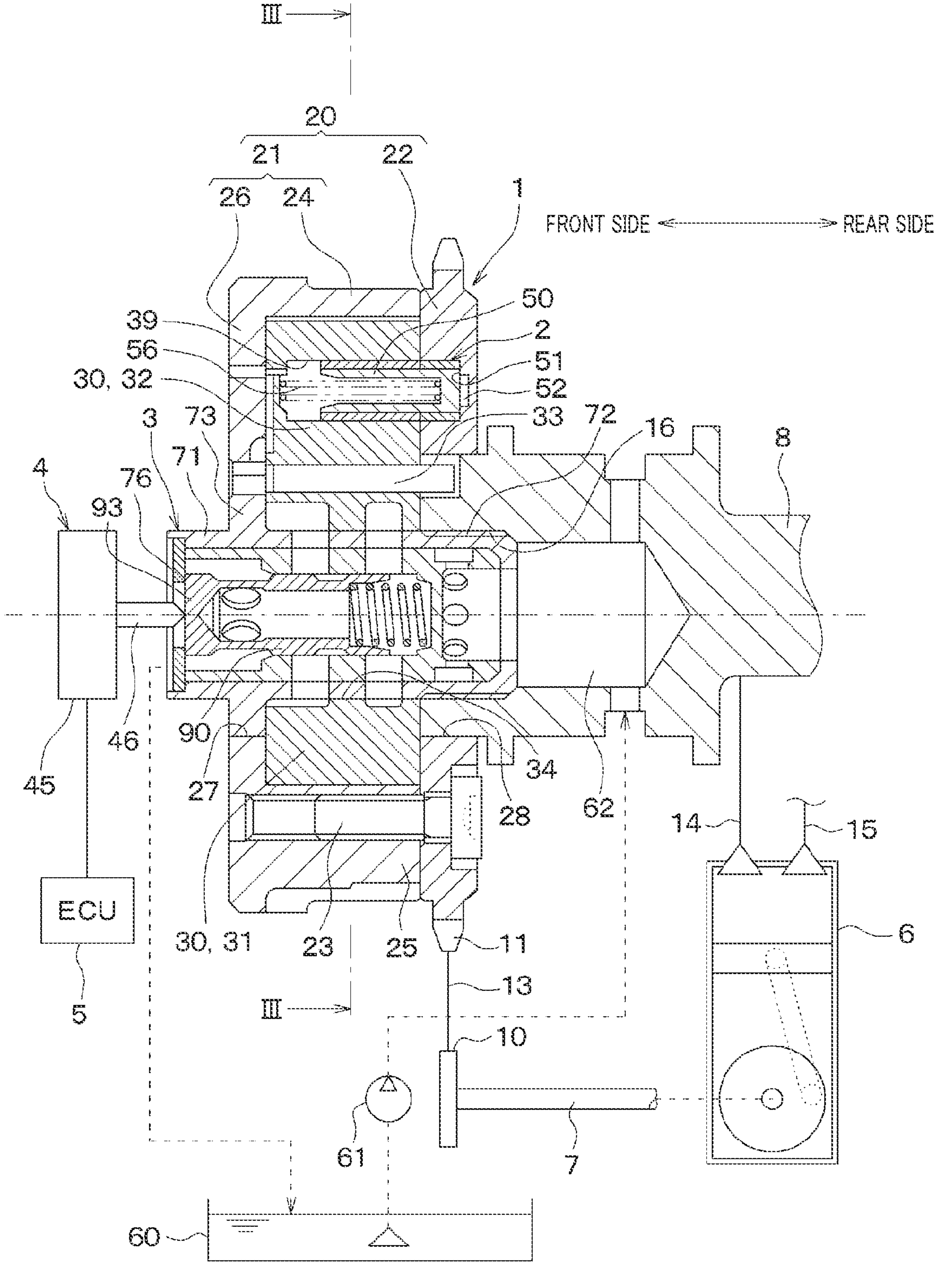
FIG. 1 is a sectional view of a schematic configuration of a valve timing adjustment system according to a first embodiment.

Valve timing adjustment systems have conventionally been known that adjust the opening or closing timing of an intake valve or an exhaust valve of an internal combustion engine.

A valve timing adjustment system described in Japanese Patent No. 4161880 includes a valve timing adjustment device, a phase lock mechanism, a fluid pressure control device and an electronic control device, and the like. The valve timing adjustment device includes a housing that rotates together with a drive shaft of an internal combustion engine, and a vane rotor that partitions a hydraulic chamber formed in the housing into an advance hydraulic chamber and a retard hydraulic chamber, and that rotates together with a driven shaft of the internal combustion engine. The phase lock mechanism is configured to lock the relative rotation of the vane rotor and the housing by fitting, into a fitting recess of the housing, the tip of a lock pin disposed in a receiving hole of the vane rotor in a reciprocable manner. The fluid pressure control device includes a hydraulic control valve and an electromagnetic drive section that are integrally formed, the hydraulic control valve including a spool and a sleeve, and the electromagnetic drive section moving the spool in the shaft direction, and the fluid pressure control device supplies hydraulic pressure to the hydraulic chamber of the valve timing adjustment device.

The electronic control device performs a control of supplying, as a control command value, power with a prescribed duty cycle obtained according to PWM control to the electromagnetic drive section of the fluid pressure control device. When the phase lock mechanism is released, this electronic control device performs a control of gradually changing the control command value from a first prescribed value, which is different from a release command value for achieving a most easily lock-releasing fluid pressure state and is set as a start value, to a second prescribed value through the release command value with the lapse of time. Japanese Patent No. 4161880 indicates that even when the release command value is varied according to the temperature and the viscosity of operating oil used in the valve timing adjustment system, the speed of the internal combustion engine, or the like, this feature makes it possible to increase the possibility of releasing the phase lock mechanism by making the control command value pass, between the first prescribed value and the second prescribed value, the release command value.

A study of the inventor, however, has clarified the following problem of the valve timing adjustment system described in Japanese Patent No. 4161880, the problem occurring when the operating oil has a high viscosity in a low-temperature environment or when a high-viscosity type of oil is used as the operating oil. That is, when the operating oil used in the valve timing adjustment system has a high viscosity and the fluid resistance is thus increased, the spool has trouble starting to move. Therefore, when it takes time for the spool of the hydraulic control valve to start to move after the electronic control device issues a control command by the first prescribed value to the fluid pressure control device, the control command value passes the release command value without the movement of the spool. Thereafter, when starting to move, the spool rushes toward an operation position corresponding to the control command value of that moment, and therefore the hydraulic pressure supplied to the valve timing adjustment device surges. Therefore, there is a possibility that before the phase lock mechanism is released, excessive torque acts from the vane rotor and housing on the lock pin of the phase lock mechanism, causing the tip of the lock pin to stick to the inner wall of the fitting recess, and thus making it impossible to release the phase lock mechanism.

Hereinafter, embodiments of the present disclosure are described with reference to the drawings. The mutually identical or equivalent parts between the following embodiments share the identical reference sign, and the description is omitted.

First Embodiment

A first embodiment will be described with reference to drawings. A valve timing adjustment system according to the present embodiment is mounted on a vehicle and adjusts the opening or closing timing of an intake valve or an exhaust valve of an internal combustion engine.

As illustrated in FIG. 1, the valve timing adjustment system includes a valve timing adjustment device 1, a phase lock mechanism 2, a hydraulic control valve 3, an electromagnetic drive section 4, an electronic control device 5, and the like. First, the configurations of the valve timing adjustment system are described, and thereafter, an energization control performed by the electronic control device 5 is described.

<Configuration of Valve Timing Adjustment Device 1>

Figure 2:
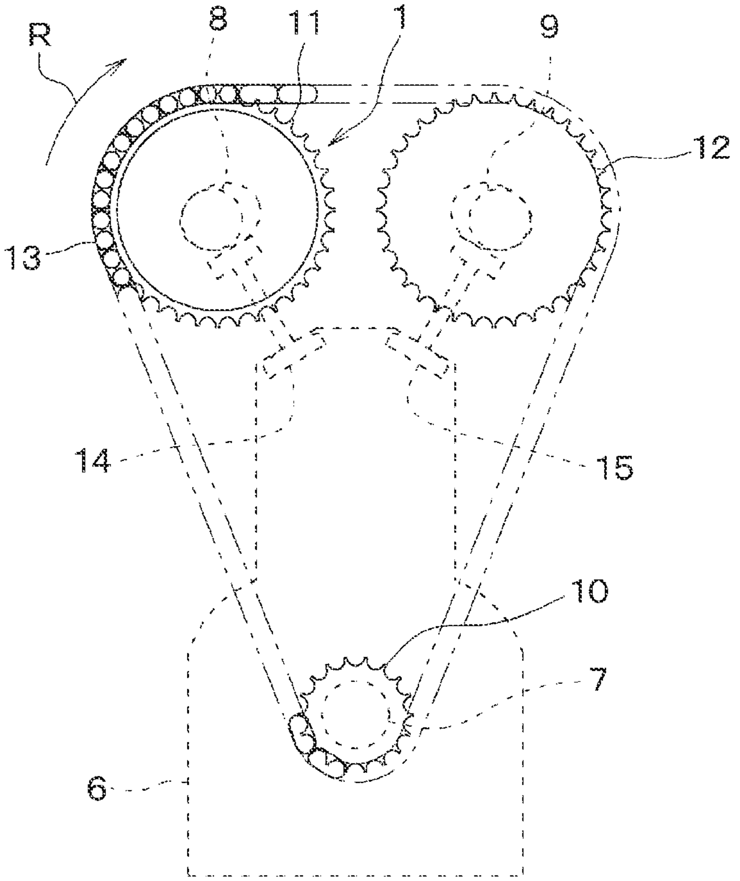
FIG. 2 is a schematic configuration diagram of an internal combustion engine employing the valve timing adjustment system according to the first embodiment.

As illustrated in FIG. 2, the valve timing adjustment device 1 is disposed in a torque transmission system for transmitting torque from a drive shaft, i.e., a crankshaft 7, of an internal combustion engine 6 to two driven shafts, i.e., camshafts 8, 9. In the torque transmission system, a chain 13 is wound around a gear 10 fixed to the crankshaft 7, and two gears 11, 12 fixed respectively to the camshafts 8, 9, and the torque is transmitted from the crankshaft 7 to the two camshafts 8, 9. One of the camshafts, i.e., the camshaft 8, drives an intake valve 14 for opening or closing, and the other, i.e., the camshaft 9, drives an exhaust valve 15 for opening or closing. An arrow R in FIG. 2 represents the rotational direction of the chain 13 and the like. The torque transmission system is not limited to the configuration including the chain 13 as illustrated in FIG. 2, but a configuration including a belt may also be employed.

In the present embodiment, described as an example is the valve timing adjustment device 1 disposed at an end of the camshaft 8 that drives the intake valve 14 for opening or closing, the valve timing adjustment device adjusting the opening or closing timing of the intake valve 14. In the following description, the "rear side" is defined as the camshaft-8 side with respect to the valve timing adjustment device 1, and the "front side" as the side opposite to the camshaft-8 side.

Figure 3:
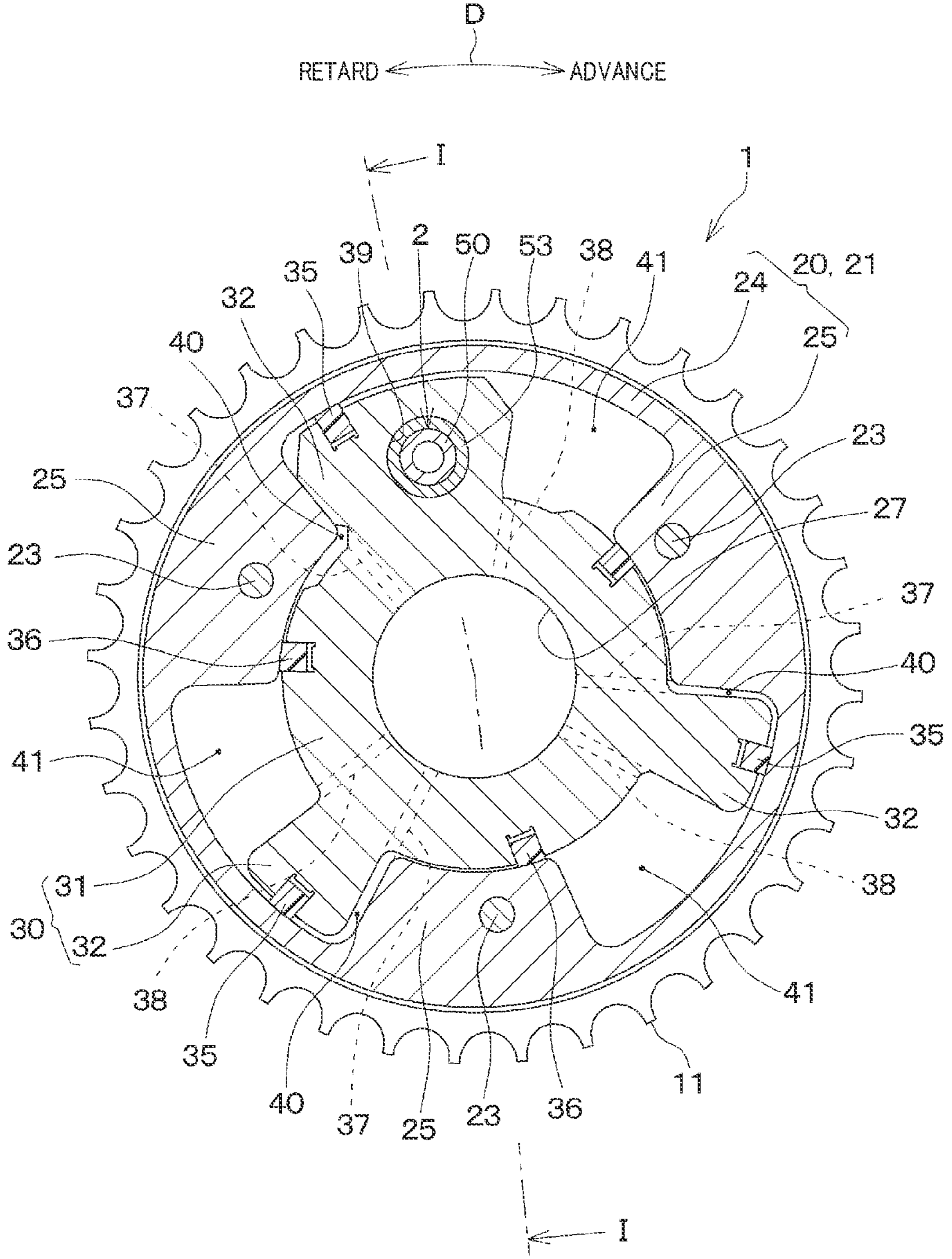
FIG. 3 is a sectional view taken along a line III-III in FIG. 1.

As illustrated in FIGS. 1 and 3, the valve timing adjustment device 1 includes a housing 20, a vane rotor 30, and the like. The valve timing adjustment device 1 includes a phase lock mechanism 2 and a hydraulic control valve 3. In FIG. 3, the hydraulic control valve 3 is omitted.

The housing 20 of the valve timing adjustment device 1 of the present embodiment is configured to include a shoe housing 21 and a rear plate 22 connected to each other with a bolt 23. The shoe housing 21 is integrally formed of a circumferential wall 24, which is circular, a plurality of shoes 25 extending inward from the circumferential wall 24 in the radial direction, and a front plate 26. In the housing 20, a plurality of hydraulic chambers partitioned by the plurality of shoes are formed. The front plate 26 includes in a central portion thereof a hole 27 for having the hydraulic control valve 3 inserted thereinto. On the other hand, the rear plate 22 includes a hole 28 for putting the camshaft 8 therethrough. The gear 11 is disposed on the outer periphery of the rear plate 22. The chain 13 illustrated in FIG. 2 is connected to the gear 11. With this configuration, the housing 20 is rotated together with the drive shaft, i.e., the crankshaft 7, of the internal combustion engine 6.

The vane rotor 30 is integrally formed of a rotor 31, which is cylindrical, and a plurality of vanes 32 extending outward from the rotor 31 in the radial direction. The vane rotor 30 is disposed in the housing 20 and in a relatively rotatable manner within a prescribed angle range with respect to the housing 20. The camshaft 8 is fixed to an end in the shaft direction of the vane rotor 30. Positioning in the circumferential direction of the vane rotor 30 and the camshaft 8 is performed by a knock pin 33, which also regulates the relative rotation. Further, the vane rotor 30 and the camshaft 8 are fixed by an outer sleeve 71 of the hydraulic control valve 3. Specifically, the outer sleeve 71 is inserted into a center hole 34 penetrating a rotational center portion of the vane rotor 30 in the shaft direction. In addition, a male screw 72 disposed on an outer wall of the outer sleeve 71 is threadably engaged with a female screw 16 disposed on the camshaft 8, and a flange 73 disposed on the outer wall of the outer sleeve 71 is in contact with the vane rotor 30. With this configuration, the vane rotor 30 and the camshaft 8 are fixed by the outer sleeve 71 and the vane rotor 30 is rotated together with the driven shaft, i.e., the camshaft 8, of the internal combustion engine 6.

The vanes 32 of the vane rotor 30 partition the hydraulic chamber formed in the housing into an advance hydraulic chamber 40 and a retard hydraulic chamber 41. Seal members 35 disposed on the outer side in the radial direction of the vanes 32 are in liquid-tight and slide contact with the circumferential wall 24 of the housing 20, and seal members 36 disposed on the outer side in the radial direction of the rotor 31 are in liquid-tight and slide contact with the shoes 25 of the housing 20. This configuration regulates leakage of operating oil between the advance hydraulic chamber 40 and the retard hydraulic chamber 41.

The advance hydraulic chamber 40 is in communication with an advance oil passage 37 disposed in the vane rotor 30. The operating oil is supplied to and discharged from the advance hydraulic chamber 40 via the advance oil passage 37. The retard hydraulic chamber 41 is in communication with a retard oil passage 38 disposed in the vane rotor 30. The operating oil is supplied to and discharged from the retard hydraulic chamber 41 via the retard oil passage 38.

When the hydraulic pressure of the operating oil supplied to the advance hydraulic chamber 40 is higher than the hydraulic pressure of the operating oil supplied to the retard hydraulic chamber 41, the vane rotor 30 is relatively and rotationally moved to the advance side with respect to the housing 20. In contrast, when the hydraulic pressure of the operating oil supplied to the retard hydraulic chamber 41 is higher than the hydraulic pressure of the operating oil supplied to the advance hydraulic chamber 40, the vane rotor 30 is relatively and rotationally moved to the retard side relative with respect to the housing 20. Generally, advance means hastening the opening or closing timing of the intake valve 14 or the exhaust valve 15, and retard means delaying the opening or closing timing of the intake valve 14 or the exhaust valve 15. An arrow D in FIG. 3 represents the advance direction and the retard direction of the vane rotor 30 with respect to the housing 20. That is, the valve timing adjustment device 1 can control the housing 20 and the vane rotor 30 to a target rotational phase and adjust the opening or closing timing of the intake valve 14 by adjusting the hydraulic pressure of the operating oil supplied to the advance hydraulic chamber 40 and the retard hydraulic chamber 41. In the following description, the advance hydraulic chamber 40 and the retard hydraulic chamber 41 are referred to as the "hydraulic chambers 40, 41".

<Configuration of Phase Lock Mechanism 2>

Figure 4:
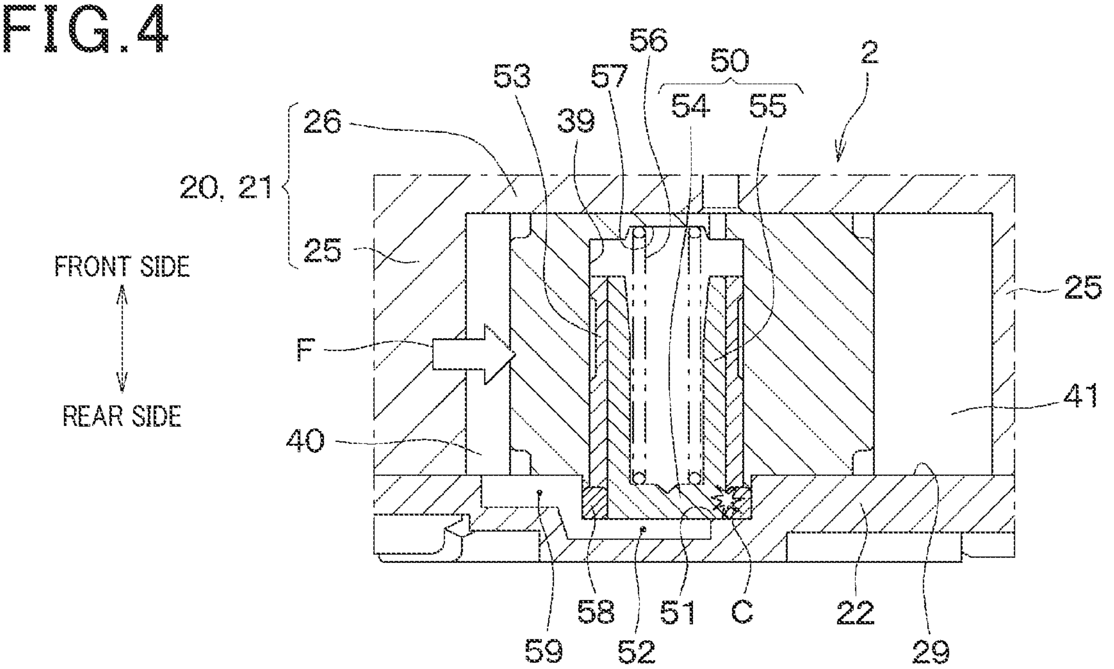
FIG. 4 is a sectional view of a phase lock mechanism disposed in a valve timing adjustment device.

Next, the configuration of the phase lock mechanism 2 is described. As illustrated in FIGS. 1, 3, and 4, the phase lock mechanism 2 of the present embodiment includes a lock pin 50, a fitting recess 51, a release hydraulic chamber 52, and the like.

In one of the vanes 32 of the vane rotor 30, a receiving hole 39 for receiving the lock pin 50 is disposed. A tube member 53 that is cylindrical is fixed to the inside of the receiving hole 39 by press fitting. The lock pin 50 is received in the tube member 53 and reciprocable in the shaft direction.

The lock pin 50 is formed in a closed-bottom cylindrical shape and includes a bottom 54 and a cylindrical portion 55. A spring 56 is disposed in the lock pin 50. One end of the spring 56 is locked with a spring receiver 57 disposed on an inner wall of the receiving hole 39 of the vane 32, and the other end of the spring 56 is locked with an inner wall of the bottom 54 of the lock pin 50. The spring 56 is a compression coil spring, and biases the lock pin 50 toward the rear-plate-22 side On the other hand, the fitting recess 51 is disposed so as to be recessed from a hydraulic chamber-side surface 29 of the rear plate 22 in the housing 20 toward the rear side. A ring member 58 that is cylindrical is fixed to an inner wall of the fitting recess 51 by press fitting. A bottom 54-side end of the lock pin 50 can be fitted with the inside in the radial direction of the ring member 58. The fitting recess 51 of the present embodiment is disposed at a position corresponding to the position of the lock pin 50 located when the phase of the vane rotor 30 is controlled to a full retard position with respect to the housing 20. That is, in the present embodiment, the fitting phase in which the lock pin 50 is fitted into the fitting recess 51 is a full retard phase. By the fitting of the lock pin 50 into the fitting recess 51, start of the internal combustion engine 6 becomes possible. In addition, by the fitting of the lock pin 50 into the fitting recess 51, it is possible to prevent rattle generated through oscillation of the vane rotor 30 and the housing 20 on which forward or reverse cam torque works from a cam mechanism driving the intake valve 14 at the time of low hydraulic pressure, for example, when the internal combustion engine 6 is started.

A space in the fitting recess 51 that faces the bottom 54 of the lock pin 50 functions as the release hydraulic chamber 52. The release hydraulic chamber 52 is a hydraulic chamber for applying the hydraulic pressure to the lock pin 50 in a direction of the lock pin 50 coming out from the fitting recess 51. The release hydraulic chamber 52 of the present embodiment is in communication with only the advance hydraulic chamber 40 via an oil passage 59 and is in non-communication with the retard hydraulic chamber 41. That is, the phase lock mechanism 2 of the present embodiment employs a so-called "one-side pressure pin mechanism". Therefore, the lock pin 50 of the present embodiment is fitted into the fitting recess 51 when the phase of the vane rotor 30 is controlled to the full retard position with respect to the housing 20 and the hydraulic pressure of the advance hydraulic chamber 40 is smaller than a pin-release pressure Pa described later. In the present embodiment, the advance hydraulic chamber 40 in communication with the release hydraulic chamber 52 is a hydraulic chamber whose hydraulic pressure is increased when the vane rotor 30 and the housing 20 are relatively rotated toward a non-fitting phase (a full advance phase in the present embodiment) farthest from the fitting phase.

When the phase of the vane rotor 30 is controlled from the full retard phase to the advance side with respect to the housing 20, the phase control is performed after removing the lock pin 50 from the fitting recess 51 (that is, after the release of the lock). In the phase control, when the force of the hydraulic pressure supplied to the release hydraulic chamber 52 works on a surface in the shaft direction of the lock pin 50 more greatly than the biasing force generated by the spring 56 biasing the lock pin 50, it becomes possible for the lock pin 50 to come out from the fitting recess 51 (that is, the release of the lock). Here, a value defined as Pa is the hydraulic pressure (that is, the pin-release pressure) enabling the release of the lock pin 50 from the fitting recess 51, Aa is the area obtained by projecting a surface of the lock pin 50, which faces the release hydraulic chamber 52, on a virtual plane perpendicular to the shaft center of the lock pin 50, and Fs is the biasing force of the spring 56. With this definition, the relationship is represented by Equation 1 as follows.

$$Pa=Fs/Aa \quad \text{(Equation 1)}$$

That is, the lock pin 50 comes out from the fitting recess 51 in the following situation. That is to say, the situation is when the hydraulic pressure supplied to the release hydraulic chamber 52 is the pin-release pressure Pa or greater, and further the force that works from the hydraulic chambers 40, 41 on the vane rotor 30 comes into balance with the cam torque that works from the camshaft 8 on the vane rotor 30. Then, with the lock pin 50 removed from the fitting recess 51 (that is, with the phase lock mechanism 2 released), controlling the phase to the advance side becomes possible. However, when the hydraulic pressure is suddenly and greatly supplied to the advance hydraulic chamber 40 before the lock pin 50 comes out from the fitting recess 51, the force represented by an arrow F in FIG. 4 sometimes works on the vane rotor 30. In that case, there is a concern that as represented by a star symbol C in FIG. 4, the tip of the lock pin 50 gets stuck with an inner wall of the fitting recess 51 (specifically, an inner wall of the ring member 58) and thus the phase lock mechanism 2 cannot be released. A means for solving this problem is described later in an energization control by the electronic control device 5.

<Configuration of Hydraulic Control Valve 3>

Subsequently, the configuration of the hydraulic control valve 3 is described. As illustrated in FIG. 1, the hydraulic control valve 3 is disposed in the center hole 34 penetrating the rotational center portion of the vane rotor 30 in the shaft direction. The hydraulic control valve 3 has a function of supplying the operating oil pumped by a hydraulic pump 61 from an oil pan 60 to the hydraulic chambers 40, 41, and a function of discharging the operating oil discharged from the hydraulic chambers 40, 41 to the outside of the valve timing adjustment device 1.

Figure 5:
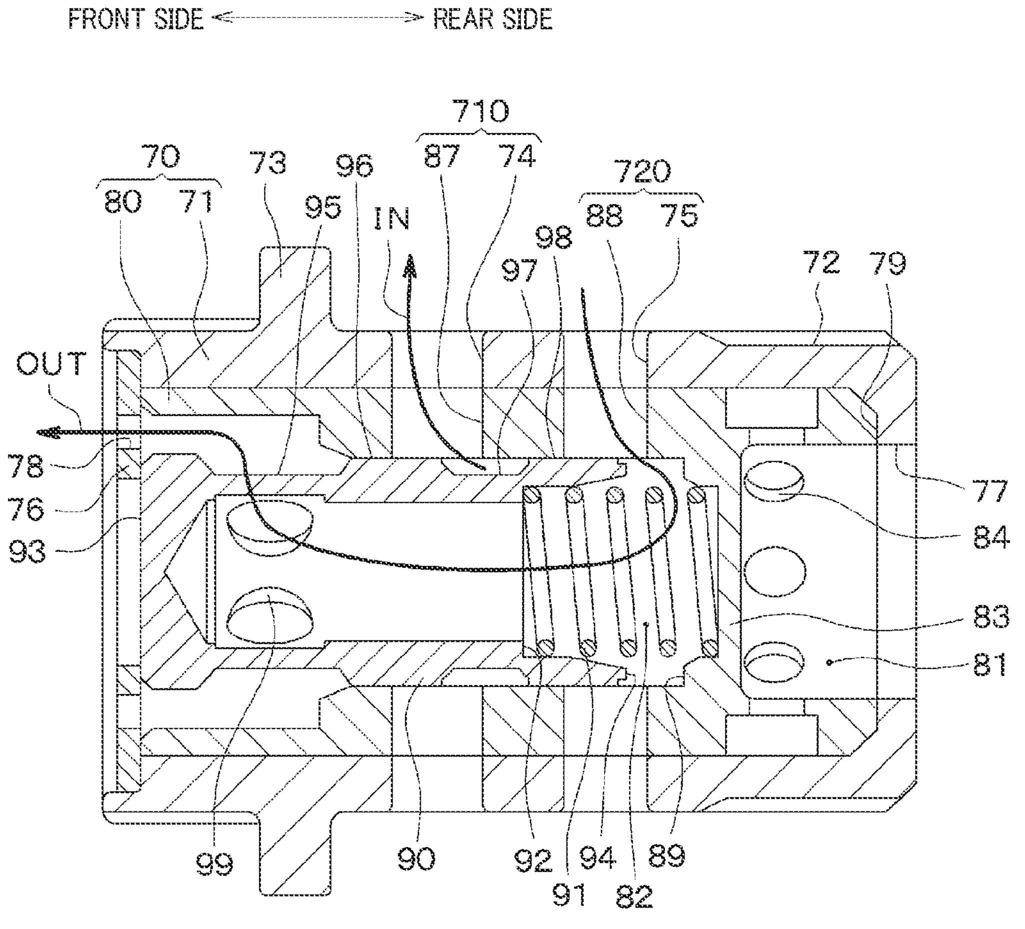
FIG. 5 is a sectional view of a hydraulic control valve in which a spool is at zero stroke.

As illustrated in FIGS. 1 and 5, the hydraulic control valve 3 includes the outer sleeve 71, an inner sleeve 80, a spool 90, and the like. In the following description, the outer sleeve 71 and the inner sleeve 80 are sometimes collectively called the “sleeves 70”.

As described above, the outer sleeve 71 fixes the vane rotor 30 and the camshaft 8. Therefore, the outer sleeve 71, the vane rotor 30, and the camshaft 8 are fixed so as not to be relatively rotated.

The outer sleeve 71 formed in a tube shape and includes an outside retard port 74 and an outside advance port 75 in this order from the front side. A stopper ring 76, which is annular, is fixed to an aperture on the front side of the outer sleeve 71. On the other hand, an opening 77 on the rear side of the outer sleeve 71 is in communication with an operating oil chamber 62 disposed in the camshaft 8.

The inner sleeve 80 is fixed to the inside of the outer sleeve 71. An outer wall surface on the outer side in the radial direction of the inner sleeve 80 is in contact with an inner wall surface on the inner side in the radial direction of the outer sleeve 71. An end on the rear side of the inner sleeve 80 is in contact with an outer peripheral portion 79 disposed on the outer periphery of the opening 77 on the rear side of the outer sleeve 71. On the other hand, an end on the front side in the shaft direction of the inner sleeve 80 is in contact with the stopper ring 76. This configuration prevents displacement in the shaft direction of the inner sleeve 80 and the outer sleeve 71.

Figure 6:
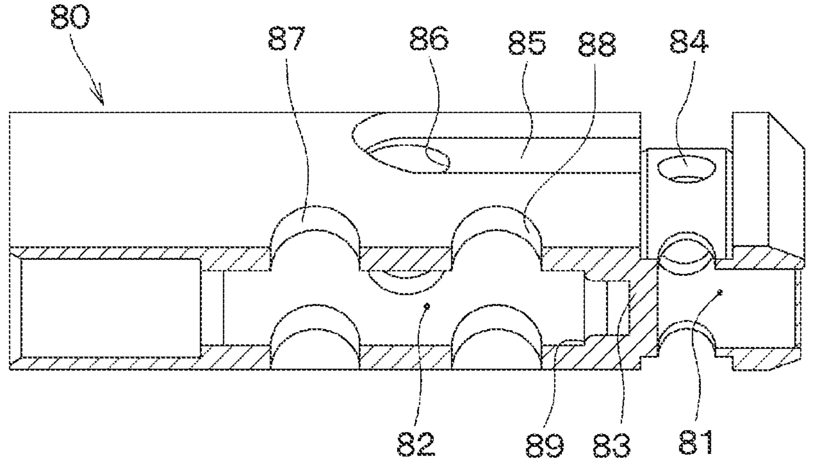
FIG. 6 is a sectional view of an inner sleeve of the hydraulic control valve.

As illustrated in FIGS. 5 and 6, the inner sleeve 80 includes an operating oil supply chamber 81 in communication with the operating oil chamber 62 of the camshaft 8. The inner sleeve 80 includes a receiving chamber 82 for receiving the spool 90. The operating oil supply chamber 81 and the receiving chamber 82 are partitioned by a partition wall 83.

As illustrated in FIG. 6, the inner sleeve 80 includes a communication hole 84 in communication with the operating oil supply chamber 81, a communication groove 85 extending on an outer wall of the inner sleeve 80 in the shaft direction from the communication hole 84, and a through hole 86 penetrating the inner sleeve 80 from the communication groove 85 inward in the radial direction. The through hole 86 is disposed in a receiving chamber 82-side region.

The inner sleeve 80 includes, in the receiving chamber 82-side region, an inside retard port 87 and an inside advance port 88 in this order from the front side. The inside retard port 87 and the inside advance port 88, and the communication groove 85 and the through hole 86 are disposed at different positions in the circumferential direction of the inner sleeve 80. Further, the through hole 86 is disposed at a position in the middle between the inside retard port 87 and the inside advance port 88 in the shaft direction of the inner sleeve 80.

As illustrated in FIG. 5, the inside retard port 87 is, in the radial direction, in communication with the outside retard port 74, and the inside advance port 88 is, in the radial direction, in communication with the outside advance port 75. Therefore, in the following description, the outside retard port 74 and the inside retard port 87 are collectively called “retard ports 710”, and the outside advance port 75 and the inside advance port 88 are collectively called “advance ports 720”. The retard ports 710 are in communication with the retard oil passage 38 disposed in the vane rotor 30, and the advance ports 720 are in communication with the advance oil passage 37 disposed in the vane rotor 30.

The spool 90 is formed in a closed-bottom tube shape, and is disposed in the receiving chamber 82 of the inner sleeve 80 and reciprocable in the shaft direction. An outer wall surface on the outer side in the radial direction of the spool 90 is in slide contact with an inner wall surface on the inner side in the radial direction of the inner sleeve 80.

A spring 91 is disposed between the spool 90 and the partition wall 83. One end of the spring 91 is locked with a bump 92 disposed at a part of an inner wall of the spool 90, and the other end of the spring 91 is locked with the partition wall 83. The spring 91 is a compression coil spring, and biases the spool 90 toward the stopper-ring-76 side. FIG. 5 illustrates a state in which an end 93 on the front side of the spool 90 is in contact with the stopper ring 76. With this state, the position on the front side in the shaft direction of the spool 90 is determined. This position of the spool 90 is called an initial position or zero stroke of the spool 90.

Figure 7:
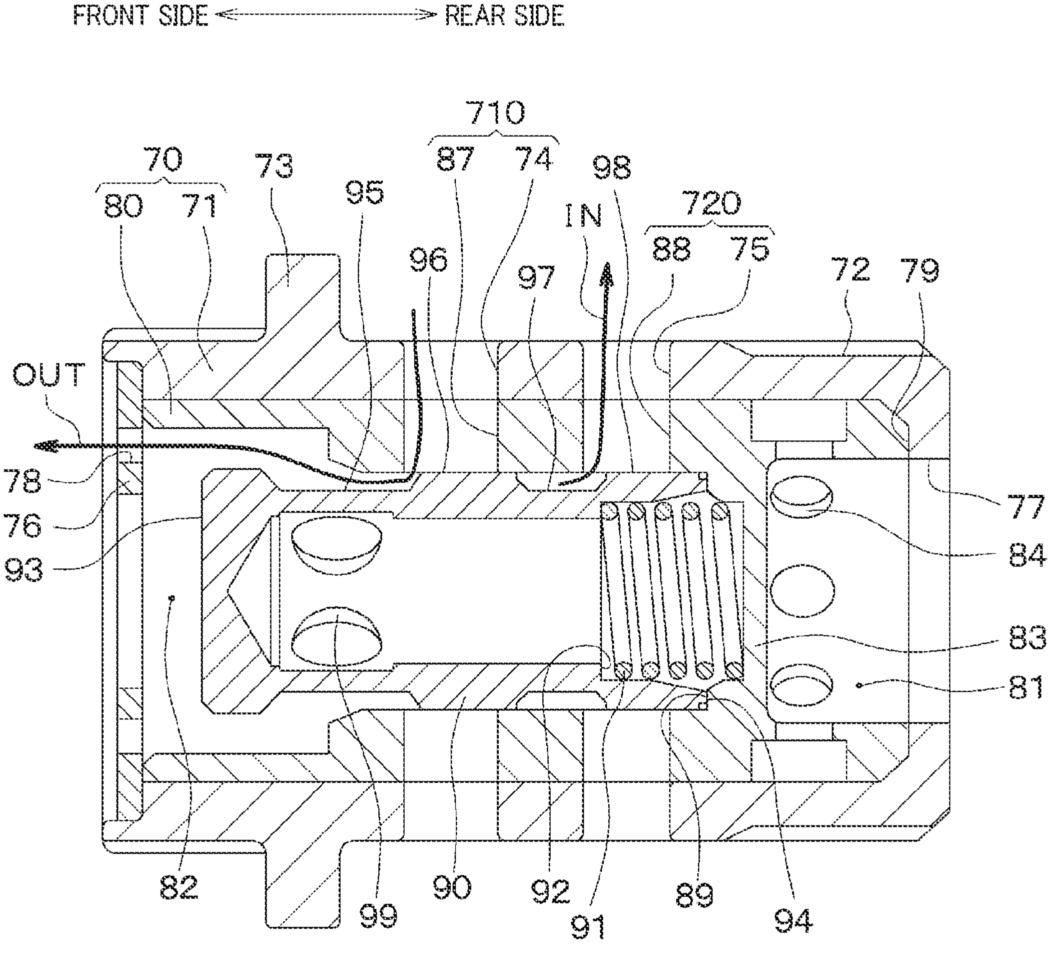
FIG. 7 is a sectional view of the hydraulic control valve in which the spool is at full stroke.

On the other hand, FIG. 7 illustrates a state in which the spool 90 is pressed from the front side to the rear side by a pressing pin 46 of a solenoid actuator, i.e., the electromagnetic drive section 4 described later. As illustrated in FIG. 7, when the spool 90 is pressed from the front side to the rear side by the pressing pin 46 of the solenoid actuator, the spring 91 is compressed, making an end 94 on the rear side of the spool 90 contact with a bump surface 89 disposed on the outer periphery of the partition wall 83 of the inner sleeve 80. With this state, the position on the rear side in the shaft direction of the spool 90 (that is, a maximum movement position of the spool 90) is determined. This position of the spool 90 is called the maximum movement position or full stroke of the spool 90.

On an outer wall on the outer side in the radial direction of the spool 90, an operating oil discharge groove 95, a front-side seal portion 96, an operating oil supply groove 97, and a rear-side seal portion 98 are disposed in this order from the front side. The operating oil discharge groove 95, the front-side seal portion 96, the operating oil supply groove 97, and the rear-side seal portion 98 are all disposed continuously over the spool 90 in the circumferential direction of the spool. The operating oil discharge groove 95 includes a hole 99 penetrating in the plate thickness direction. The front-side seal portion 96 and the rear-side seal portion 98 are both in liquid-tight and slide contact with an inner wall surface on the inner side in the radial direction of the inner sleeve 80. The operating oil supply groove 97 is disposed at a position that always allows communication with the through hole 86 of the inner sleeve 80 in the movement of the spool 90 between the zero stroke (that is, the initial position) and the full stroke (that is, the maximum movement position). Therefore, the operating oil pumped from the oil pan 60 by the hydraulic pump 61 is supplied through the operating oil chamber 62 of the camshaft 8, the operating oil supply chamber 81 of the inner sleeve 80, the communication hole 84, the communication groove 85, the through hole 86, and the operating oil supply groove 97 in this order. In this configuration, the hydraulic control valve 3 can control the operating oil and the hydraulic pressure supplied to the hydraulic chambers 40, 41 by changing the position in the shaft direction of the spool 90 and thus making the operating oil supply groove 97 communicate with the retard ports 710 or the advance ports 720.

Next described are the supply of the operating oil to the hydraulic chambers 40, 41 and the discharge of the operating oil from the hydraulic chambers 40, 41 by the hydraulic control valve 3.

As described above, FIG. 5 illustrates a state in which the spool 90 is at zero stroke (that is, the initial position). In this state, the opening area of openings of the retard ports 710 with respect to the operating oil supply groove 97 is maximum, and the area of openings of the advance ports 720 with respect to the receiving chamber 82 is maximum. In this condition, as represented by an arrow IN, the operating oil pumped from the oil pan 60 flows through the operating oil supply groove 97, the retard ports 710, and the retard oil passage 38, and is supplied to the retard hydraulic chamber 41. On the other hand, as represented by an arrow OUT, the operating oil in the advance hydraulic chamber 40 flows through the advance oil passage 37, the advance ports 720, the receiving chamber 82, the hole 99 of the operating oil discharge groove 95, and the hole 78 of the stopper ring 76, and is discharged to the oil pan 60.

As described above, FIG. 7 illustrates a state in which the spool 90 is at full stroke (that is, the maximum movement position). In this state, the opening area of openings of the advance ports 720 with respect to the operating oil supply groove 97 is maximum, and the area of openings of the retard ports 710 with respect to the receiving chamber 82 via the operating oil discharge groove 95 is maximum. In this condition, as represented by an arrow IN, the operating oil pumped from the oil pan 60 flows through the operating oil supply groove 97, the advance ports 720, and the advance oil passage 37, and is supplied to the advance hydraulic chamber 40. On the other hand, as represented by an arrow OUT, the operating oil in the retard hydraulic chamber 41 flows through the retard oil passage 38, the retard ports 710, the receiving chamber 82, and the hole 78 of the stopper ring 76, and is discharged to the oil pan 60.

Figure 8:
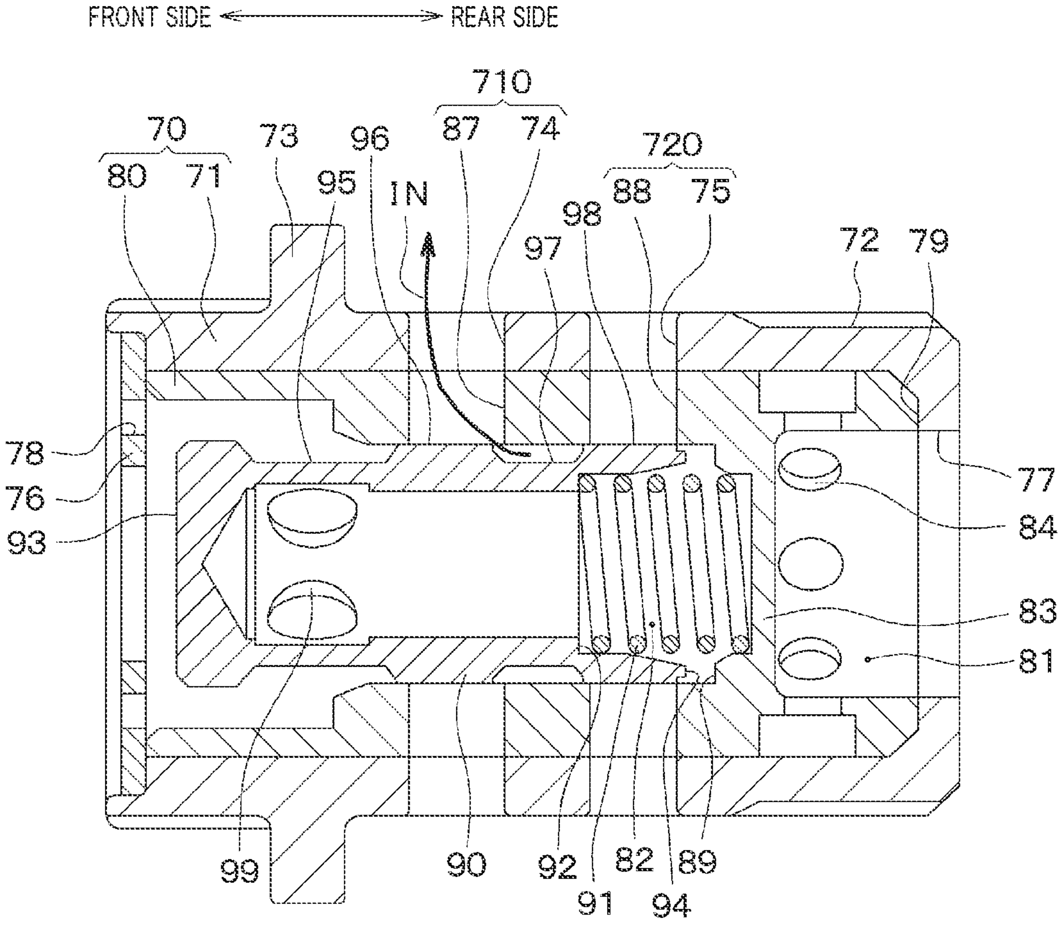
FIG. 8 is a sectional view of the hydraulic control valve in which the spool is at holding stroke.
Figure 9:
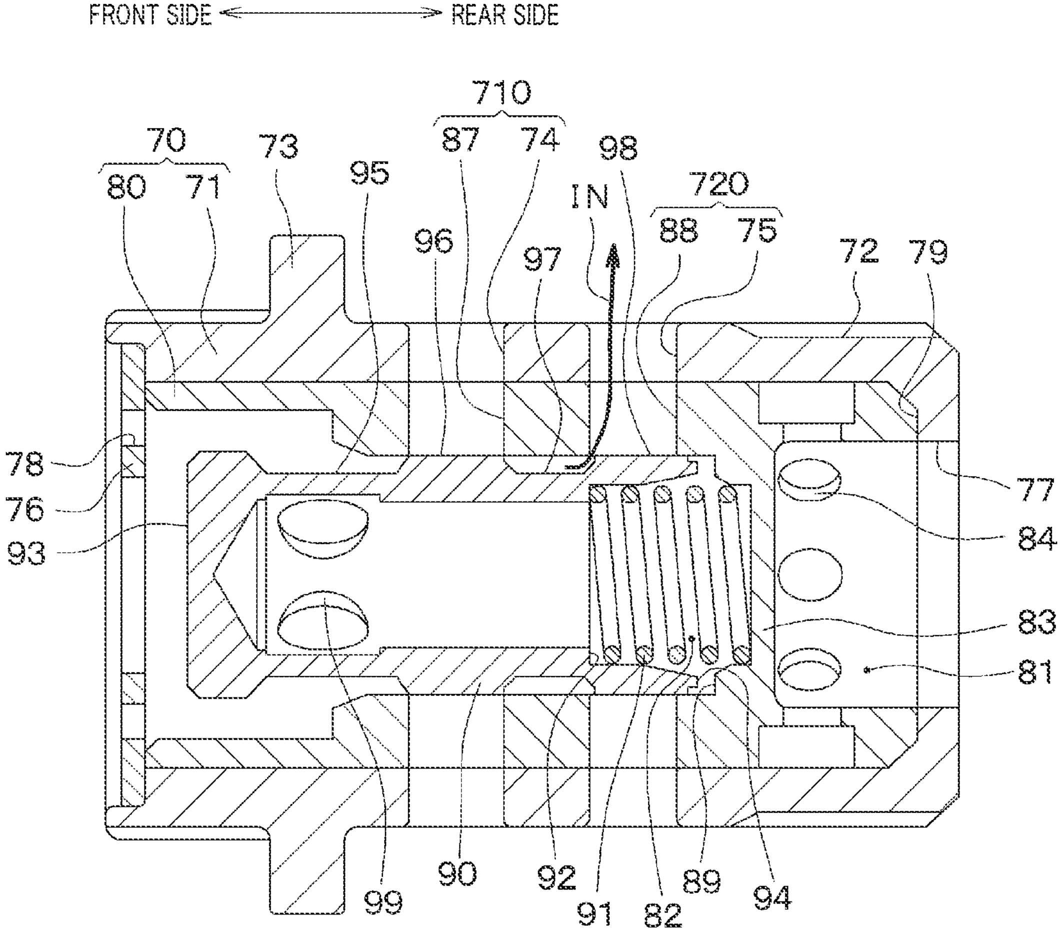
FIG. 9 is a sectional view of the hydraulic control valve in which the spool is at holding stroke.

FIGS. 8 and 9 illustrate a state in which the spool 90 is located between the zero stroke and the full stroke, and the operating oil is discharged from neither of the hydraulic chambers 40, 41. The relative rotational phase of the housing 20 and the vane rotor 30 of the valve timing adjustment device 1 can be held in this state. The position of the spool 90 of the hydraulic control valve 3 in this state is called holding stroke.

Specifically, FIG. 8 illustrates a state in which the ends on the rear side of the advance ports 720 are coincident with the end on the rear side of the rear-side seal portion 98. In this state, the advance ports 720 are closed by the rear-side seal portion 98. Therefore, the operating oil is hardly discharged from the advance hydraulic chamber 40. On the other hand, the retard ports 710 are in communication with the operating oil supply groove 97. Therefore, as represented by an arrow IN, relatively small amounts of the operating oil and the hydraulic pressure are supplied from the operating oil supply groove 97 through the retard ports 710 and the retard oil passage 38 to the retard hydraulic chamber 41.

FIG. 9 illustrates a state in which the ends on the front side of the retard ports 710 are coincident with the end on the front side of the front-side seal portion 96. In this state, the retard ports 710 are closed by the front-side seal portion 96. Therefore, the operating oil is hardly discharged from the retard hydraulic chamber 41. On the other hand, the advance ports 720 are in communication with the operating oil supply groove 97. Therefore, as represented by an arrow IN, relatively small amounts of the operating oil and the hydraulic pressure are supplied from the operating oil supply groove 97 through the advance ports 720 and the advance oil passage 37 to the advance hydraulic chamber 40. Thus, in the states of the holding stroke illustrated in FIGS. 8 and 9, the operating oil is hardly discharged from the hydraulic chambers 40, 41, in other words, the amount of the operating oil discharged is 0 or minimum.

<Configuration of Electromagnetic Drive Section 4>

Subsequently described is the electromagnetic drive section 4, which, as illustrated in FIG. 1, is a solenoid actuator formed of a member other than the hydraulic control valve 3 and is disposed in front of the hydraulic control valve 3. The electromagnetic drive section 4 includes a main portion 45 and the pressing pin 46. The main portion 45 is attached to a solenoid cover (not illustrated). The pressing pin 46 protrudes from the main portion 45 toward the hydraulic-control-valve-3 side. The tip of the pressing pin 46 can contact with or separate from the end 93 on the front side of the spool 90. The electromagnetic drive section 4 increases the pressing force generated by the pressing pin 46 pressing the spool 90 rearward against the biasing force of the spring 91 with the increase in the amount of current applied to the main portion 45. The position of the pool 90 is determined by the balance between the load applied from the pressing pin 46 to the spool 90 and the biasing force of the spring 91. Accordingly, the electromagnetic drive section 4 can change the position in the shaft direction of the spool 90 by reciprocally moving the pressing pin 46 in the shaft direction according to the amount of current applied to the main portion 45. However, the response speed (that is, follow-up performance) of the positional change in the shaft direction of the spool 90 with respect to the amount of current supplied from the electronic control device 5 to the electromagnetic drive section 4 sometimes changes according to the viscosity of the operating oil.

<Configuration of Electronic Control Device 5>

The electronic control device 5 (hereinafter, referred to as an "ECU") includes a microcomputer including a processor and a memory, and a peripheral circuit, and controls the energization to the electromagnetic drive section 4 and the like connected to the output side on the basis of a control program stored in the memory. The ECU is an abbreviation for Electric Control Unit. The memory of the ECU is a non-transitory tangible storage medium. The ECU controls the phase of the valve timing adjustment device 1 by controlling the current applied to the electromagnetic drive section 4 according to the operation state and the like of the internal combustion engine 6. Specifically, the ECU controls the current applied to the electromagnetic drive section 4 by PWM control. PWM is an abbreviation for Pulse Width Modulation.

Figure 10:
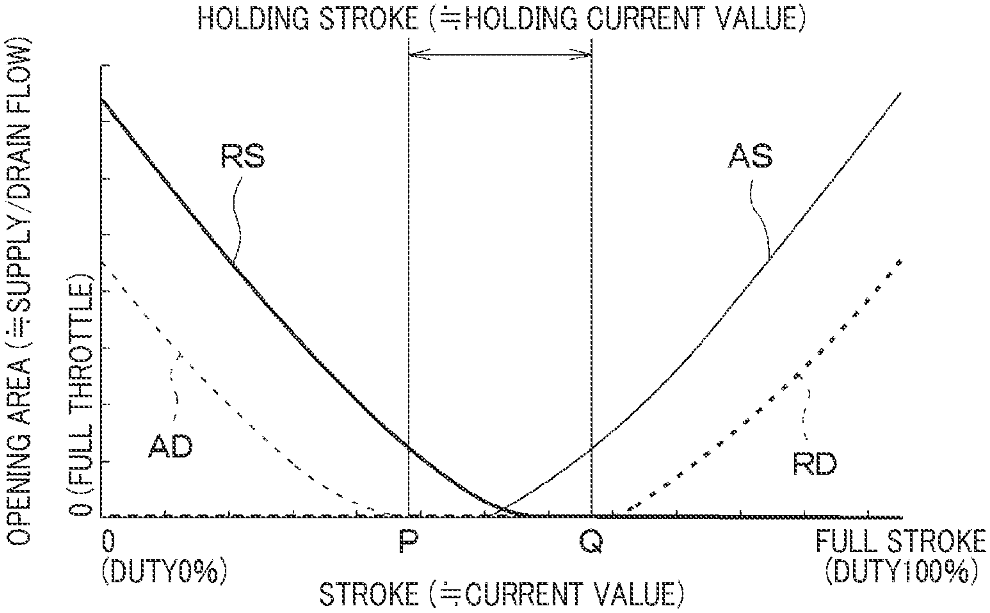
FIG. 10 is a graph illustrating a relationship between the stroke of the spool in the hydraulic control valve or the current value, and the opening area of ports or the supply/discharge flow of operating oil.

Described with reference to a graph of FIG. 10 is, for example, a relationship between the current value obtained by the ECU adjusting the duty cycle by the PWM control and applied to the electromagnetic drive section 4, and the flow of the operating oil supplied to and discharged from the hydraulic chambers 40, 41 through the hydraulic control valve 3. The graph of FIG. 10 illustrates a basic state, and the relationship is sometimes changed according to the tolerance in producing the constituent members of the valve timing adjustment system, the mounted state of the system on vehicle, the speed of the internal combustion engine 6, the temperature of oil, or the like.

The horizontal axis of the graph in FIG. 10 represents the duty cycle (that is, the current value) obtained by the PWM control of the ECU, and the stroke amount of the spool 90 that moves along with the duty cycle. When the duty cycle is 0%, the spool 90 is at zero stroke. When the duty cycle is 100%, the spool 90 is at full stroke.

On the other hand, the vertical axis of the graph in FIG. 10 represents the opening area of the advance ports 720 and the opening area of the retard ports 710 of the hydraulic control valve 3, and the flow of the operating oil supplied to and discharged from the hydraulic chambers 40, 41 through the hydraulic control valve 3. The opening area of the advance ports 720 and the opening area of the retard ports 710 are nearly proportional to the flow of the operating oil supplied to and discharged from the hydraulic chambers 40, 41 through the ports. Specifically, when the opening area of the advance ports 720 is 0, the flow of the operating oil supplied to or discharged from the advance hydraulic chamber 40 is 0 or minimum, and the flow of the operating oil supplied to or discharged from the advance hydraulic chamber 40 increases with the increase of the opening area of the advance ports 720. When the opening area of the retard ports 710 is 0, the flow of the operating oil supplied to or discharged from the retard hydraulic chamber 41 is 0 or minimum, and the flow of the operating oil supplied to or discharged from the retard hydraulic chamber 41 increases with the increase of the opening area of the retard ports 710.

A solid line RS in FIG. 10 represents the flow of the operating oil supplied to the retard hydraulic chamber 41 through the retard ports 710, and a broken line AD represents the flow of the operating oil discharged from the advance hydraulic chamber 40 through the advance ports 720. On the other hand, a solid line AS represents the flow of the operating oil supplied to the advance hydraulic chamber 40 through the advance ports 720, and a broken line RD represents the flow of the operating oil discharged from the retard hydraulic chamber 41 through the retard ports 710.

In the graph of FIG. 10, when the duty cycle is 0% and the spool 90, which moves along with the duty cycle, is at zero stroke, the flow of the operating oil supplied to the retard hydraulic chamber 41 through the retard ports 710 is maximum. At this time, the flow of the operating oil discharged from the advance hydraulic chamber 40 through the advance ports 720 is also maximum. This state corresponds to the state illustrated in FIG. 5. At this time, the valve timing adjustment device 1 has the phase thereof controlled so that the vane rotor 30 is moved to the retard side with respect to the housing 20.

In the graph of FIG. 10, when the duty cycle is 100% and the spool 90, which moves along with the duty cycle, is at full stroke, the flow of the operating oil supplied to the advance hydraulic chamber 40 through the advance ports 720 is maximum. At this time, the flow of the operating oil discharged from the retard hydraulic chamber 41 through the retard ports 710 is also maximum. This state corresponds to the state illustrated in FIG. 7. At this time, the valve timing adjustment device 1 has the phase thereof controlled so that the vane rotor 30 is moved to the advance side with respect to the housing 20.

In the graph of FIG. 10, when the duty cycle is P % to Q % and the spool 90 is in a range of the holding stroke, the amount of the operating oil discharged from the hydraulic chambers 40, 41 is 0 or minimum. In detail, the state of the spool 90 moving along with a duty cycle of P % corresponds to the state illustrated in FIG. 8. In this state, the operating oil is hardly discharged from the advance hydraulic chamber 40, and relatively small amounts of the operating oil and the hydraulic pressure are supplied to the retard hydraulic chamber 41. On the other hand, the state of the spool 90 moving along with a duty cycle of Q % corresponds to the state illustrated in FIG. 9. In this state, the operating oil is hardly discharged from the retard hydraulic chamber 41, and relatively small amounts of the operating oil and the hydraulic pressure are supplied to the advance hydraulic chamber 40. In the following description, the current value applied to locate the spool 90 at holding stroke with the duty cycle set to P % to Q % by the ECU is called a "holding current value".

Thus, the ECU can control the phase of the valve timing adjustment device 1 by changing the duty cycle and thereby controlling the current applied to the electromagnetic drive section 4 to adjust the flow of the operating oil supplied to and discharged from the hydraulic chambers 40, 41. Further, the ECU can release the phase lock mechanism 2 by controlling the flow of the operating oil supplied to and discharged from the hydraulic chambers 40, 41 and the release hydraulic chamber 52 at the time of starting to control the phase of the valve timing adjustment device 1. Releasing the phase lock mechanism 2 specifically means removing the lock pin 50 from the fitting recess 51.

<Energization Control Performed by ECU at Time of Releasing Phase Lock Mechanism 2>

Subsequently described is the energization control performed by the ECU at the time of releasing the phase lock mechanism 2 in the valve timing adjustment system according to the present embodiment. Before the description, however, a problem to be addressed at the time of releasing the phase lock mechanism 2 is described.

The valve timing adjustment system employing a one-side pressure pin mechanism as the phase lock mechanism 2 is required to release the phase lock mechanism 2 and make the vane rotor 30 rapidly reach a target phase at the time of activating a system that controls the phase of the vane rotor 30 from the full retard phase to the advance side.

The valve timing adjustment system, however, sometimes generate the following problem when the operating oil has a high viscosity in a low-temperature environment or when a high-viscosity type of oil is used as the operating oil. That is, when the operating oil has a high viscosity and the fluid resistance is thus increased, the spool 90 of the hydraulic control valve 3 has trouble starting to move. Specifically, as illustrated in FIG. 5, when the phase lock mechanism is locked in the control to the full retard phase, the duty cycle is 0% and the spool 90 is at zero stroke in the energization control by the ECU, with the end 93 on the front side of the spool 90 being in contact with the stopper ring 76. When an attempt is made to move the spool 90 from this state to the rear side, linking force, which is force opposite to the force of moving the spool, works on the spool 90 and the stopper ring 76. Here, the linking force is force generated when one of objects in contact with each other in fluid is separated from the other, due to a decrease of pressure in a gap between contact portions of the objects, the force being generated in the direction opposite to the traveling direction of the one object.

Generally, linking force FI between circular contact portions is represented by Equation 2 as follows, with the viscosity coefficient of the operating oil defined as $\mu$, the movement speed of an object as V, the clearance between two objects as h, the radius of the object as R, and the contact area of the two objects as $\pi R^2$.

$$FI=(3/2\pi)\cdot(\mu V/h^3)\cdot(\pi R^2)^2 \quad \text{(Equation 2)}$$

Equation 2 clarifies the fact that when the viscosity coefficient $\mu$ of the operating oil attached to the contact place between the spool 90 and the stopper ring 76 is increased, the linking force is also increased in proportion to the viscosity coefficient $\mu$. Therefore, when the operating oil has a high viscosity, the spool 90 has trouble starting to move. Further, the spool 90 has trouble starting to move also when the operating oil has a high viscosity and the fluid resistance is thus increased between the seal portions 96, 98 on the outer side in the radial direction of the spool 90 and the inner wall surface on the inner side in the radial direction of the inner sleeve 80. Due to this trouble, there is a problem to be addressed in which the delay of activation time of the valve timing adjustment device 1 is increased.

In order to improve the delay of activation time of the valve timing adjustment device 1, the hydraulic pressure of the advance hydraulic chamber 40 is considered to be suddenly and greatly increased. That is, in the energization control by the ECU, the duty cycle is instantaneously switched from 0 to a duty cycle corresponding to a target current value for making the vane rotor 30 reach a target phase, and the corresponding duty cycle is maintained until the vane rotor 30 reaches the target phase. With this procedure, the operating oil is supplied to the advance hydraulic chamber 40 and also to the release hydraulic chamber 52 from the advance hydraulic chamber 40, and therefore it seems that the lock pin 50 is released and the vane rotor 30 is controlled to the target phase. Such a procedure, however, causes excessive torque to work from the vane rotor 30 and the housing 20 on the lock pin 50 by, as represented by the arrow F in FIG. 4, increasing the hydraulic pressure of the advance hydraulic chamber 40 suddenly and greatly before the lock pin 50 starts the action of coming out from the fitting recess 51. Therefore, there is a concern that the tip of the lock pin 50 gets stuck with the inner wall of the fitting recess 51 and the phase lock mechanism 2 cannot be released.

Figure 11:
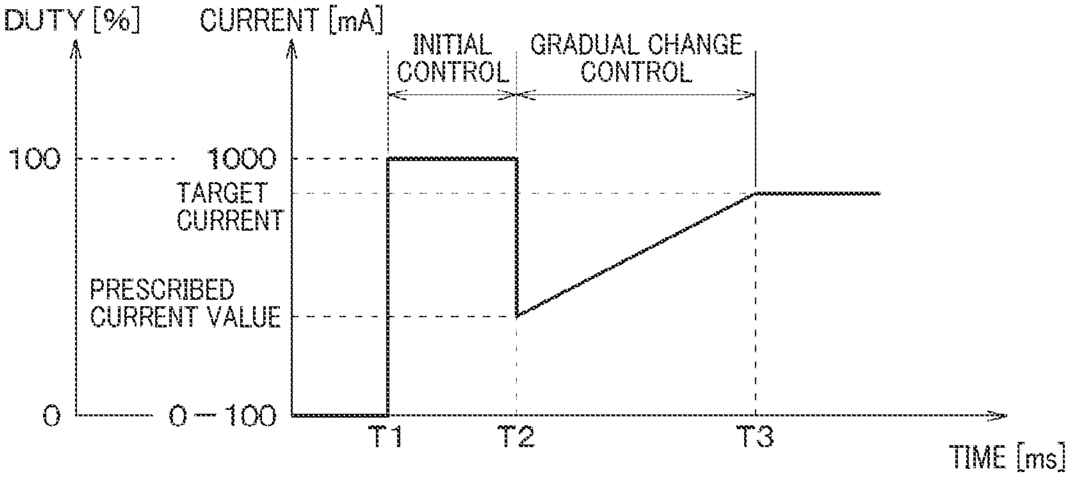
FIG. 11 is a graph illustrating an energization control performed at the time of releasing a phase lock in the first embodiment.

In order to solve the problem described above, the ECU of the valve timing adjustment system according to the present embodiment performs the energization control illustrated in FIG. 11 at the time of releasing the phase lock mechanism 2. The ECU, by this energization control, applies current according to a prescribed duty cycle to the electromagnetic drive section 4 and moves the spool 90 along with the current, to supply the operating oil and the hydraulic pressure to the hydraulic chambers of the valve timing adjustment device 1 and remove the lock pin 50 from the fitting recess 51.

In a graph of FIG. 11, the horizontal axis represents the time, and the vertical axis represents the duty cycle and the current value according to the PWM control by the ECU.

At time T1 in FIG. 11, the energization control by the ECU for releasing the phase lock mechanism 2 is started. Between time T1 and time T2, the ECU performs an initial control of applying current to the electromagnetic drive section 4 at a prescribed current value (for example, a duty cycle of 100%) for a prescribed time. This initial control can securely move the spool 90 from the initial position and change the state of the spool into an easily slidable state even when the operating oil has a high viscosity. That is, by instantaneously increasing the duty cycle at the time of starting the energization control, it is possible to immediately separate the spool 90 from the stopper ring 76. That is, by performing such a procedure, it is possible to immediately separate the spool 90 from the stopper ring 76 against the linking force generated at the contact place between the spool 90 and the stopper ring 76 and against the fluid resistance between the inner wall of the inner sleeve 80 and the seal portions 96, 98. The "prescribed current value" applied when the initial control is performed may be any value as long as the spool 90 can be moved from the initial position even when the operating oil has a high viscosity. The "prescribed current value" applied when the initial control is performed is, for example, a current value greater than the holding current value, preferably a duty cycle of 100 to 95%, more preferably a duty cycle of 100%. The prescribed time of the initial control is preferably 50 to 100 ms.

Subsequently, between time T2 and time T3, the ECU performs a gradual change control of gradually increasing the current value from a current value smaller than the current value applied in the initial control but greater than 0. In the present description, the "current value greater than 0" means a current value greater than 0 mA or a current value greater than a duty cycle of 0% (for example, a prescribed value in a current value between 0 mA and 100 mA). By this gradual change control, it is possible to remove the lock pin 50 from the fitting recess 51. That is, this gradual change control gradually increases the hydraulic pressure and the amount of the operating oil supplied to the advance hydraulic chamber 40 through the hydraulic control valve 3. By this gradual change control, it is possible to increase the hydraulic pressure of the release hydraulic chamber 52 and remove the lock pin 50 from the fitting recess 51 before the torque that works from the vane rotor 30 and the housing 20 on the lock pin 50 becomes excessive. This procedure can prevent failure in which the tip of the lock pin 50 becomes stuck to the inner wall of the fitting recess 51 and the lock cannot be released. The inclination of the current in the gradual change control performed from time T2 to time T3 is preferably, for example, about 1 A/sec.

In the process of the gradual change control performed from time T2 to time T3, the lock pin 50 comes out from the fitting recess 51. Specifically, the lock pin 50 comes out from the fitting recess 51 in the following situation. That is to say, the situation is when the hydraulic pressure supplied to the release hydraulic chamber 52 in the process of the gradual change control is the pin-release pressure Pa or greater, and further the force that works from the advance hydraulic chamber 40 and the retard hydraulic chamber 41 on the vane rotor 30 comes into balance with the cam torque that works on the vane rotor 30.

As described above, the current value applied at the time of starting the gradual change control at time T2 (hereinafter, referred to as a "gradual change start current value") is smaller than the current value applied in the initial control but greater than 0. In detail, the gradual change start current value is set to a prescribed current value in a range of the holding current value. Alternatively, the gradual change start current value is set to a prescribed current value in a range smaller than the holding current value but greater than 0. Specifically, the gradual change start current value is preferably a prescribed current value with a duty cycle between 20 and 50%. When a duty cycle of 100 is set to equal 1000 mA, the gradual change start current value is preferably a prescribed current value between 200 mA and 500 mA.

By setting the gradual change start current value to a prescribed current value in the range of the holding current value, a region in which the hydraulic pressure is suddenly and greatly supplied to the retard hydraulic chamber 41, that is, a region unnecessary for releasing the phase lock mechanism 2 is removed when the gradual change control is performed. Therefore, it is possible to prevent the tip of the lock pin 50 from becoming stuck to the inner wall of the fitting recess 51, and shorten the time for releasing the phase lock mechanism 2. That is, the activation time of the valve timing adjustment device 1 can be shortened.

By the way, the holding current value described with reference to FIG. 10 is, as described above, sometimes varied according to the tolerance in producing the constituent members of the valve timing adjustment system, the mounted state of the system on vehicle, the speed of the internal combustion engine 6, the temperature of oil, or the like. However, by setting the gradual change start current value to a prescribed current value in the range smaller than the holding current value but greater than 0, it is possible to make the control current value always pass the range of the holding current value during the gradual change control even when the holding current value is varied. This feature can increase the possibility of releasing the phase lock mechanism 2 regardless of the variation of the holding current value.

In the cases in which the operating oil has a low viscosity such as when the operating oil has a high temperature, the moving amount of the spool 90 at the time of performing the initial control is sometimes greater than in the cases in which the operating oil has a high viscosity. Even in such cases, by setting the gradual change start current value to a prescribed current value in the range smaller than the holding current value but greater than 0, it is possible to largely take the spool 90 back to the zero-stroke side at the time of starting the gradual change control and make the control current value always pass the range of the holding current value during the gradual change control. This feature can increase the possibility of releasing the phase lock mechanism 2 across the state from a low viscosity to a high viscosity of the operating oil.

The current value applied at the time of ending the gradual change control at time T3 is set to a target current value. The target current value is a current value for relatively rotating the vane rotor 30 to the advance side and make the vane rotor 30 reach the target phase, and is thus a current value greater than the holding current value. Accordingly, by setting the current value applied at the time of ending the gradual change control to the target current value, and thus applying the target current value after making the control current value during the gradual change control always pass the upper limit value in the range of the holding current value, it is possible to make the vane rotor 30 reach the target phase in a short time. The ECU sets the control current value to the holding current value again after the vane rotor 30 reaches the target phase (not illustrated). By this setting, the vane rotor 30 is held in the target phase.

First to Third Comparative Examples

Here, for the comparison with the above-described valve timing adjustment system according to the first embodiment, valve timing adjustment systems according to first to third comparative examples are described in terms of the energization control performed by the ECU at the time of releasing the phase lock mechanism 2. The first comparative example is a control method created by the applicant of the present case and is not a conventional technique. The second comparative example is the identical control method with the method described in Japanese Patent No. 4161880 above. The third comparative example is a conventional and general control method.

First Comparative Example

Figure 12:
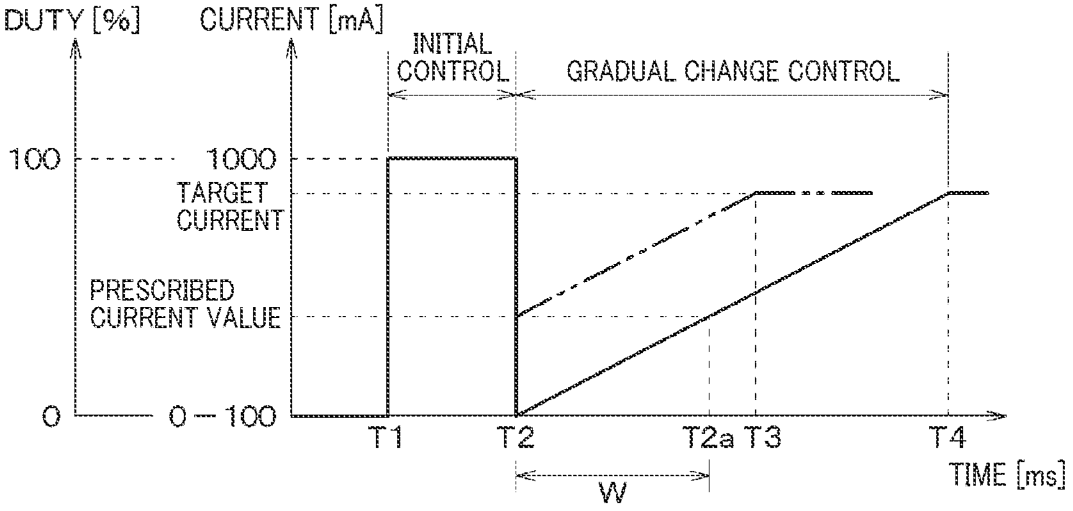
FIG. 12 is a graph illustrating an energization control performed at the time of releasing a phase lock in a first comparative example.

The ECU of the first comparative example performs the energization control illustrated in FIG. 12 at the time of releasing the phase lock mechanism 2. In FIG. 12, the solid line represents the energization control performed by the ECU of the first comparative example, and the dash-double-dot line represents the energization control described in the first embodiment.

At time T1 in FIG. 12, the ECU of the first comparative example starts the energization control for releasing the phase lock mechanism 2. Between time T1 and time T2 in FIG. 12, the ECU of the first comparative example performs an initial control of applying current to the electromagnetic drive section 4 at a prescribed current value (for example, a duty cycle of 100%) for a prescribed time. Subsequently, between time T2 and time T4, the ECU performs a gradual change control of gradually increasing the current value from a duty cycle of 0% (for example, a prescribed value in a current value between 0 mA and 100 mA).

That is, the control of the ECU of the first comparative example is different from the control in the first embodiment in that the gradual change start current value is set to a duty cycle of 0%. In this case, the time during which the gradual change control is performed is longer than the time of the control in the first embodiment. Specifically, the control method in the first comparative example is longer than the control method described in the first embodiment by the time from time T2 to time T2*a* represented by a double-headed arrow W in FIG. 12, the time being a waste time. The time from time T2 to time T2*a* is a region in which the hydraulic pressure is suddenly and greatly supplied to the retard hydraulic chamber 41 in non-communication with the release hydraulic chamber 52, in other words, a region unnecessary for releasing the phase lock mechanism 2. Accordingly, the first comparative example needs a longer activation time than in the first embodiment at the time of performing a phase control from a phase-locked state, and thus has degraded activation.

Second Comparative Example

Figure 13A:
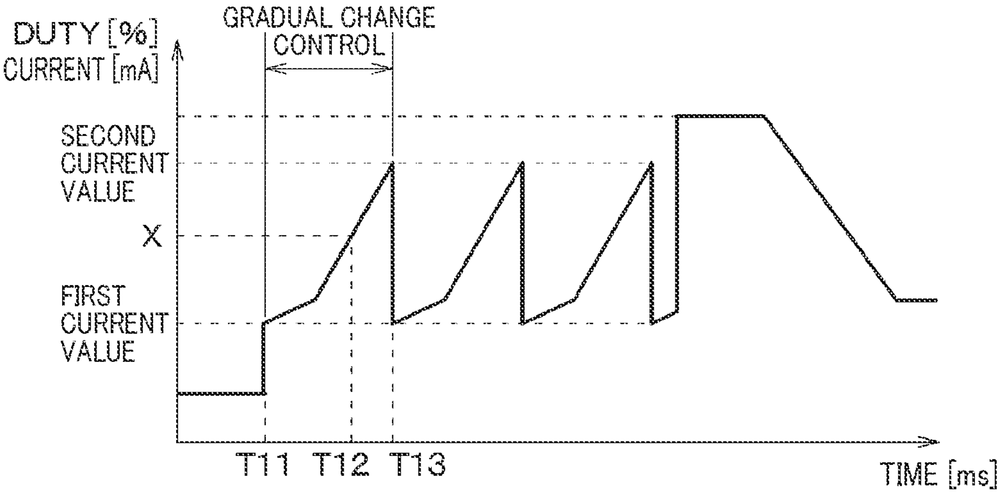
FIG. 13A is a graph illustrating an energization control performed at the time of releasing a phase lock in a second comparative example.
Figure 13B:
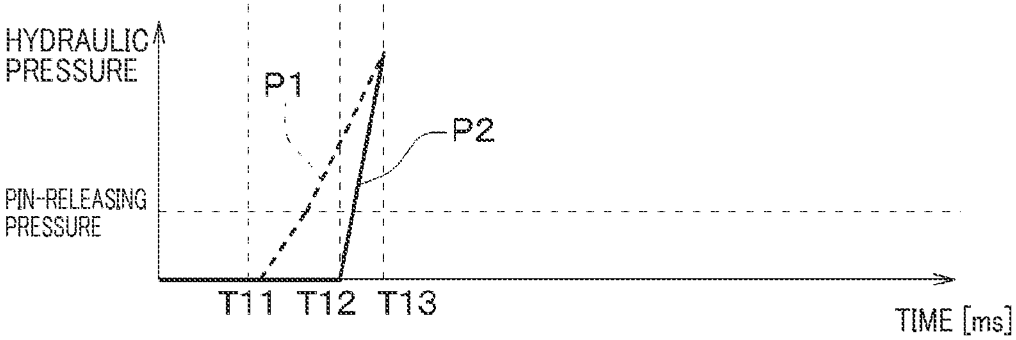
FIG. 13B is a graph illustrating a change of hydraulic pressure at the time of releasing a phase lock in the second comparative example.
Figure 13C:
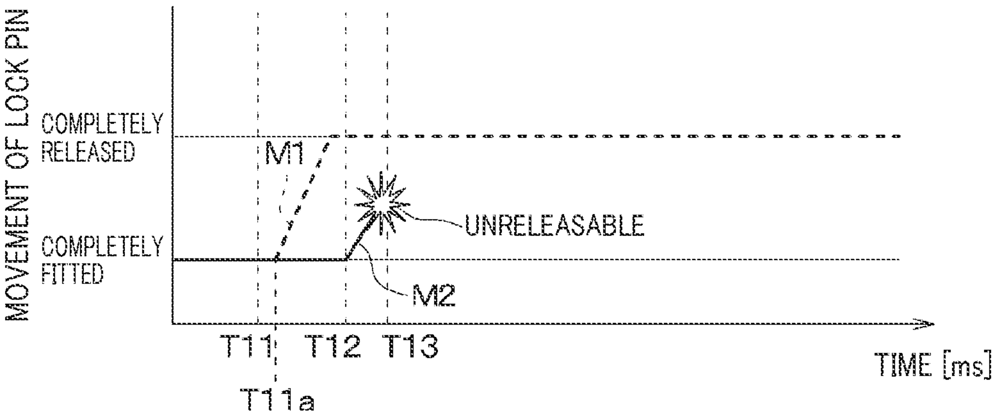
FIG. 13C is a graph illustrating the movement of a lock pin at the time of releasing a phase lock in the second comparative example.

The ECU of the second comparative example performs the energization control illustrated in FIGS. 13A to 13C at the time of releasing the phase lock mechanism 2. FIG. 13A illustrates the current value applied by the ECU to the electromagnetic drive section 4. FIG. 13B illustrates the hydraulic pressure supplied to the advance hydraulic chamber 40 in communication with the release hydraulic chamber 52. FIG. 13C illustrates the movement of the lock pin 50.

At time T11 in FIGS. 13A to 13C, the ECU of the second comparative example starts the energization control for releasing the phase lock mechanism 2. As illustrated in FIG. 13A, the ECU of the second comparative example performs, between time T11 and time T13 in FIG. 13A, a gradual change control of gradually increasing the current value from a first current value to a second current value. In the disclosure of Japanese Patent No. 4161880 described above, the "current value that achieves a most easily lock-releasing hydraulic state" is assumed to be present between the first current value and the second current value. In the second comparative example, the initial control described in the first embodiment is not performed.

In FIG. 13B, a broken line P1 represents the hydraulic pressure supplied to the advance hydraulic chamber 40 in communication with the release hydraulic chamber 52 when the operating oil has a low viscosity, for example, due to the cases in which the operating oil has a high temperature or a low-viscosity type of oil is used. In contrast, in FIG. 13B, a solid line P2 represents the hydraulic pressure supplied to the advance hydraulic chamber 40 in communication with the release hydraulic chamber 52 when the operating oil has a high viscosity, for example, due to the cases in which the operating oil has a low temperature or a high-viscosity type of oil is used. Generally, when the operating oil has a low viscosity, the spool 90 of the hydraulic control valve 3 easily starts to move. In contrast, when the operating oil has a high viscosity, the spool 90 of the hydraulic control valve 3 has a problem starting to move.

As represented by the broken line P1 in FIG. 13B, when the operating oil has a low viscosity, the hydraulic pressure supplied to the advance hydraulic chamber 40 is gradually increased from time T11. That is, when the operating oil has a low viscosity, the spool 90 of the hydraulic control valve 3 starts to move together with the start of the gradual change control, and the hydraulic pressure of the advance hydraulic chamber 40 is gradually increased along with the movement.

In contrast, as represented by the solid line P2 in FIG. 13B, when the operating oil has a high viscosity, the hydraulic pressure of the advance hydraulic chamber 40 is suddenly and greatly increased from time T12 after a prescribed time delay from time T11. That is, when the operating oil has a high viscosity, the spool 90 of the hydraulic control valve 3 has trouble starting to move, and therefore starts to move after a prescribed time delay from the start of the gradual change control. Here, as illustrated in FIG. 13A, a current value X at time T12 at which the spool 90 of the hydraulic control valve 3 starts to move is higher than the current value (that is, the first current value) at time T11 at which the gradual change control is started. Therefore, the spool 90 of the hydraulic control valve 3 immediately moves to a position corresponding to the current value X after the start of the movement, and therefore the hydraulic pressure of the advance hydraulic chamber 40 is suddenly and greatly increased from time T12.

In FIG. 13C, a broken line M1 represents the movement of the lock pin 50 when the operating oil has a low viscosity. In contrast, in FIG. 13C, a solid line M2 represents the movement of the lock pin 50 when the operating oil has a high viscosity.

As represented by the broken line M1 in FIG. 13C, when the operating oil has a low viscosity, the lock pin 50 comes out from the fitting recess 51 after time T11*a*, which is after the lapse of a prescribed time from time T11. That is, the lock pin 50 comes out from the fitting recess 51 in the following situation. That is to say, the situation is when the hydraulic pressure supplied from the advance hydraulic chamber 40 to the release hydraulic chamber 52 is the pin-release pressure Pa or greater, and further the force that works from the advance hydraulic chamber 40 and the retard hydraulic chamber 41 on the vane rotor 30 comes into balance with the cam torque that works on the vane rotor 30.

In contrast, as represented by the solid line M2 in FIG. 13C, when the operating oil has a high viscosity, the lock pin 50 cannot be released. That is, because the hydraulic pressure of the advance hydraulic chamber 40 is suddenly and greatly increased from time T12, excessive torque works from the vane rotor 30 and the housing 20 on the lock pin 50 before the lock pin 50 comes out from the fitting recess 51. Therefore, the tip of the lock pin 50 gets stuck with the inner wall of the fitting recess 51 and the phase lock mechanism 2 cannot be released. Accordingly, the second comparative example has a possibility of being incapable of releasing the lock pin 50 when the operating oil has a high viscosity.

Third Comparative Example

Figure 14:
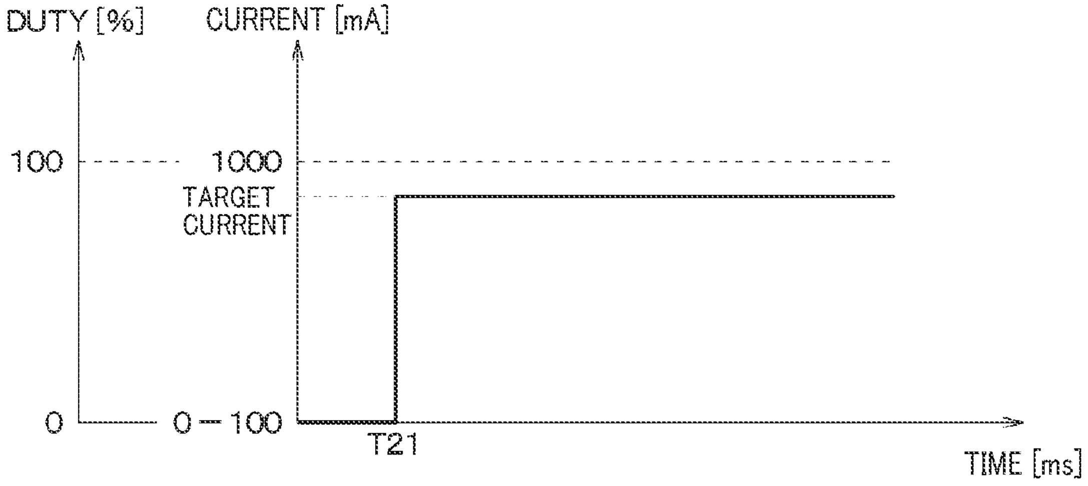
FIG. 14 is a graph illustrating an energization control performed at the time of releasing a phase lock in a third comparative example.

The ECU of the third comparative example performs the energization control illustrated in FIG. 14 at the time of releasing the phase lock mechanism 2. At time T21 in FIG. 14, the ECU of the third comparative example starts the energization control for releasing the phase lock mechanism 2. The ECU of the third comparative example immediately switches at time T21 the duty cycle from 0 to a duty cycle corresponding to a target current value for controlling the phase of the vane rotor 30 to the advance side, and thereafter maintains the duty cycle until the vane rotor 30 reaches the target phase. In that case, however, because the hydraulic pressure of the advance hydraulic chamber 40 is suddenly and greatly increased from time T21, excessive torque works from the vane rotor 30 and the housing 20 on the lock pin 50 before the lock pin 50 comes out from the fitting recess 51. Therefore, the tip of the lock pin 50 gets stuck with the inner wall of the fitting recess 51 and the phase lock mechanism 2 cannot be released. Accordingly, the third comparative example also has a possibility of being incapable of releasing the lock pin 50.

Working Effects of First Embodiment

In comparison with the first to third comparative examples described above, the valve timing adjustment system according to the first embodiment exhibits the following working effects.

(1) In the first embodiment, the ECU first performs, at the time of releasing the phase lock mechanism 2, an initial control of applying current to the electromagnetic drive section 4 at a prescribed current value for a prescribed time to move the spool 90 from an initial position (that is, zero stroke). Thereafter, the ECU performs a gradual change control of applying current to the electromagnetic drive section 4 while gradually increasing the current value from a current value smaller than the current value applied in the initial control but greater than 0, to remove the lock pin 50 from the fitting recess 51.

According to this feature, a large load is, by the initial control, instantaneously applied from the electromagnetic drive section 4 to the spool 90, and the spool 90 can thereby be securely moved from the initial position and changed into an easily slidable state even when the operating oil has a high viscosity. Therefore, by the gradual change control following the initial control, it is possible to gradually move the spool 90 along with the increase in the amount of current applied and securely release the phase lock mechanism 2.

Further, by the gradual change control, the current value is not increased from 0 (that is, 0 mA or a duty cycle of 0%), but is gradually increased from a current value greater than 0. This feature removes a region in which the hydraulic pressure is suddenly and greatly supplied to the retard hydraulic chamber 41, that is, a region unnecessary for releasing the phase lock mechanism 2. Therefore, it is possible to prevent the tip of the lock pin 50 from getting stuck with the inner wall of the fitting recess 51, and shorten the time for releasing the phase lock mechanism 2. Accordingly, this valve timing adjustment system can improve the activation thereof by being capable of releasing the phase-locked state of the valve timing adjustment device 1 in a short time and controlling the phase of the valve timing adjustment device, for example, even when the operating oil has a high viscosity.

(2) In the first embodiment, a so-called one-side pressure pin mechanism is used as the phase lock mechanism 2. That is, the release hydraulic chamber 52 of the phase lock mechanism 2 is configured to be in communication with the advance hydraulic chamber 40 via an oil passage but in non-communication with the retard hydraulic chamber 41 via an oil passage.

Due to this configuration, the one-side pressure pin mechanism has characteristics of having, in comparison with a double-side pressure pin mechanism, a larger possibility that when the hydraulic pressure is suddenly and greatly supplied to one of the advance hydraulic chamber 40 or the retard hydraulic chamber 41 at the time of releasing the phase lock mechanism 2, the tip of the lock pin 50 gets stuck with the inner wall of the fitting recess 51. The valve timing adjustment system according to the present embodiment, however, can improve the activation thereof even when the one-side pressure pin mechanism is used as the phase lock mechanism 2.

Needless to say, even when the double-side pressure pin mechanism is used as the phase lock mechanism 2 (not illustrated) in a modified example of the first embodiment, the control method described in the first embodiment can improve the activation at the time of performing the phase control from a phase-locked state.

(3) In the first embodiment, the duty cycle in the initial control is a prescribed value between 100 and 95%. This setting makes it possible to increase the load instantaneously applied from the electromagnetic drive section 4 to the spool 90 in the initial control. Therefore, the spool 90 can be moved from the zero stroke (that is, the initial position) and changed into an easily slidable state even when the operating oil has a high viscosity.

(4) In the first embodiment, the gradual change start current value is a prescribed current value in a range of the holding current value.

This setting removes a region in which the hydraulic pressure is suddenly and greatly supplied to the retard hydraulic chamber 41 at the time of starting the gradual change control, that is, a region unnecessary for releasing the phase lock mechanism 2. Therefore, it is possible to prevent the tip of the lock pin 50 from becoming stuck to the inner wall of the fitting recess 51, and shorten the time for releasing the phase lock mechanism 2.

(5) Alternatively, in the first embodiment, the gradual change start current value is a prescribed current value in a range of smaller than the holding current value but greater than 0.

This setting makes it possible to make the control current value always pass the range of the holding current value during the gradual change control even when the holding current value is varied according to the tolerance in producing the constituent members of the valve timing adjustment system, the mounted state of the system on vehicle, the speed of the internal combustion engine 6, the temperature of oil, or the like. This feature can increase the possibility of releasing the phase lock mechanism 2 regardless of the variation of the holding current value.

In the cases in which the operating oil has a low viscosity such as when the operating oil has an increased temperature, the moving amount of the spool 90 brought about by the initial control is sometimes greater than in the cases in which the operating oil has a high viscosity. Even in such cases, by setting the gradual change start current value to a prescribed current value smaller than the holding current value, it is possible to largely take the spool 90 back to the zero-stroke side at the time of starting the gradual change control and make the control current value always pass the range of the holding current value during the gradual change control. This feature can increase the possibility of releasing the phase lock mechanism 2 across the state from a low viscosity to a high viscosity of the operating oil.

(6) Alternatively, in the first embodiment, the gradual change start current value is a prescribed current value with a duty cycle between 20 and 50%.

According to this setting, a valve timing adjustment system conventionally has, in some cases, a function of learning a holding current value that is varied according to the tolerance in producing the constituent members, the mounted state of the system on vehicle, the speed of the internal combustion engine 6, the temperature of oil, or the like. In the present embodiment, however, by setting in advance the duty cycle for starting the gradual change control, it is possible to perform the gradual change control without using the valve timing adjustment system's function of learning a holding current value.

By setting the gradual change start current value to a prescribed current value with a duty cycle between 20 and 50%, a general valve timing adjustment system can make the control current value always pass the range of the holding current value during the gradual change control.

(7) Alternatively, in the first embodiment, the gradual change start current value is a prescribed current value between 200 mA and 500 mA.

According to this setting, a valve timing adjustment system conventionally has, in some cases, a function of learning a holding current value that is varied according to the tolerance in producing the constituent members, the mounted state of the system on vehicle, the speed of the internal combustion engine 6, the temperature of oil, or the like. In the present embodiment, however, by setting the gradual change start current value in advance, it is possible to perform the gradual change control without using the valve timing adjustment system's function of learning a holding current value.

By setting the gradual change start current value to 200 mA to 500 mA, a general valve timing adjustment system can make the control current value always pass the range of the holding current value during the gradual change control.

(8) Alternatively, in the first embodiment, the gradual change start current value is a prescribed current value in a range of the holding current value, or a prescribed current value in a range smaller than the holding current value but greater than 0. According to this setting, such setting of the gradual change start current value makes it possible to prevent the tip of the lock pin 50 from getting stuck with the inner wall of the fitting recess 51, and shorten the time for releasing the phase lock mechanism 2.

On the other hand, the current value applied at the time of ending the gradual change control is a target current value greater than the holding current value. This setting makes it possible to make the control current value during the gradual change control always pass the upper limit value in the range of the holding current value and then the vane rotor 30 reach the target phase in a short time by application of the target current value.

Second Embodiment

A second embodiment will be described. In the second embodiment, the energization control performed by the ECU at the time of releasing the phase lock mechanism 2 is changed from the first embodiment, and the other features are the same as in the first embodiment. Therefore, only parts different from the parts in the first embodiment are described.

The ECU of the valve timing adjustment system according to the second embodiment changes the energization control method according to the viscosity of the operating oil at the time of releasing the phase lock mechanism 2. Hereinafter, described with reference to a flow chart in FIG. 15 is a control process performed by the ECU of the second embodiment at the time of releasing the phase lock mechanism 2.

Figure 15:
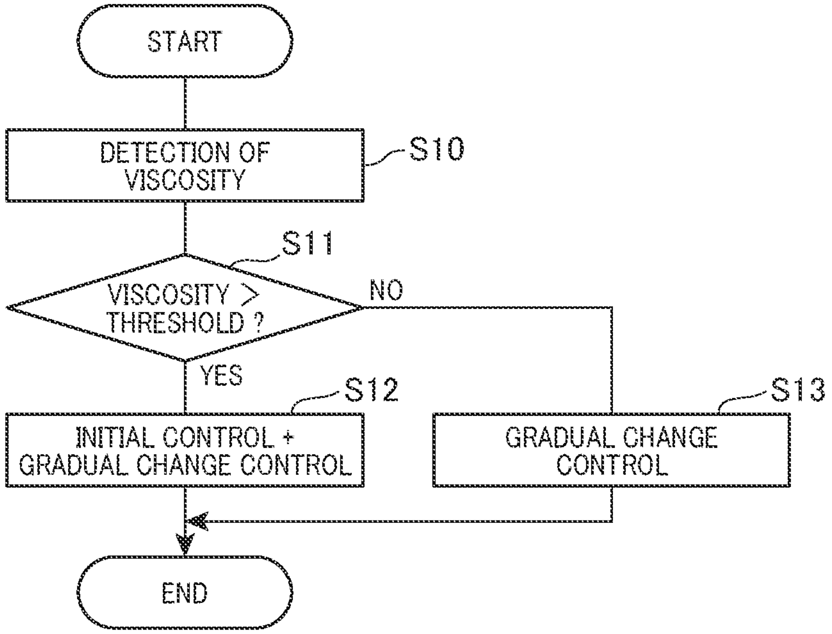
FIG. 15 is a flow chart for illustrating a control process at the time of releasing a phase lock in a second embodiment.

In step S10 of FIG. 15, the ECU detects the viscosity of the operating oil. The viscosity of the operating oil may be detected according to the type thereof, may be estimated from the temperature of the operating oil, the temperature of engine cooling water, or the like, or may be detected by a combination of those methods.

Next, in step S11, the ECU compares the viscosity of the operating oil with a prescribed threshold of viscosity stored in the ECU. The prescribed threshold of viscosity is set in advance according to, for example, an experiment about whether the initial control needs to be performed due to the operating oil having such a viscosity as to make the spool 90 have trouble starting to move from the initial state (that is, stroke 0), and the prescribed threshold of viscosity is stored in the ECU. The ECU proceeds to the process in step S12 when determining that the operating oil has a viscosity higher than the prescribed threshold of viscosity (that is, determined to be YES in step S11).

In step S12, the ECU performs the initial control and subsequently the gradual change control at the time of releasing the phase lock mechanism 2. The energization control performed at this time is substantially identical with the energization control described in the first embodiment with reference to the graph of FIG. 11.

In the second embodiment, the time for performing the initial control (that is, the time from time T1 to time T2 illustrated in FIG. 11) may be changed according to the viscosity of the operating oil. Specifically, the ECU prolongs the time for performing the initial control with the increase in the viscosity of the operating oil. The time for performing the initial control is set in a range of, for example, 50 to 300 ms. This setting makes it possible to securely move the spool 90 from the initial position without overly prolonging the time of the initial control.

On the other hand, the ECU proceeds to the process in step S13 when determining in step S11 described above that the operating oil has a viscosity lower than the prescribed threshold of viscosity (that is, determined to be NO in step S11).

In step S13, the ECU performs, without performing the initial control, the gradual change control at the time of releasing the phase lock mechanism 2. A graph of FIG. 16 illustrates the energization control performed at this time.

Figure 16:
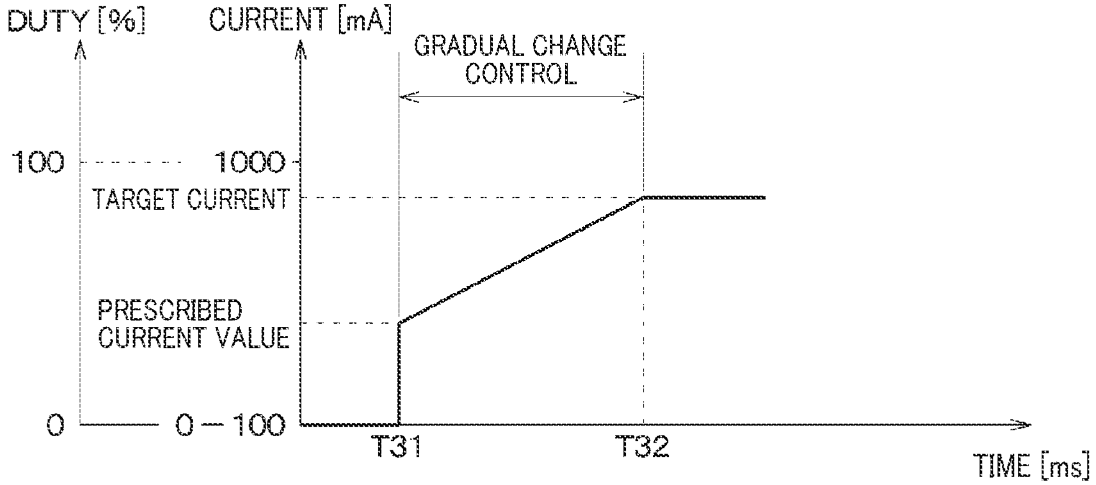
FIG. 16 is a graph illustrating an energization control performed at the time of releasing a phase lock when operating oil has a viscosity lower than a threshold in the second embodiment.

At time T31 in FIG. 16, the energization control by the ECU for releasing the phase lock mechanism 2 is started. Between time T31 and time T32, the ECU performs the gradual change control of gradually increasing the current value from a prescribed current value greater than 0 (that is, the gradual change start current value). The gradual change start current value is identical with the gradual change start current value described in the first embodiment. In this gradual change control, the spool 90 moves along with the increase in the amount of current applied, and therefore the phase lock mechanism 2 can be released.

The valve timing adjustment system according to the second embodiment described above exhibits the following working effects.

(1) In the second embodiment, the ECU performs the initial control and the gradual change control when the operating oil has a viscosity higher than a prescribed threshold of viscosity, and the ECU performs, without performing the initial control, the gradual change control when the operating oil has a viscosity lower than the prescribed threshold of viscosity.

According to this feature, when the operating oil has a low viscosity, the spool 90 does not have trouble starting to move in the sleeve 70 and moves along with the increase in the amount of current applied. Therefore, when the operating oil has a viscosity lower than the prescribed threshold of viscosity, the ECU performs, without performing the initial control, the gradual change control, and thereby it is possible to shorten the time for releasing the phase lock mechanism 2.

(2) In the second embodiment, the ECU prolongs the time for performing the initial control with the increase in the viscosity of the operating oil.

Here, the easiness of starting to move of the spool 90 and the lock pin 50 is different according to the viscosity of the operating oil. Therefore, by changing the time of the initial control according to the viscosity of the operating oil, it is possible to securely release the phase lock mechanism 2 without overly prolonging the time for releasing the phase lock mechanism 2.

Third Embodiment

A third embodiment will be described. In the third embodiment, the energization control performed by the ECU at the time of releasing the phase lock mechanism 2 is changed from the first embodiment and the like, and the other features are the same as in the first embodiment and the like. Therefore, only parts different from the parts in the first embodiment and the like are described.

The ECU of the valve timing adjustment system according to the third embodiment changes the energization control method according to the temperature of the operating oil at the time of releasing the phase lock mechanism 2. This is because the temperature and the viscosity of the operating oil are generally correlated. Hereinafter, described with reference to a flow chart in FIG. 17 is a control process performed by the ECU of the third embodiment at the time of releasing the phase lock mechanism 2.

Figure 17:
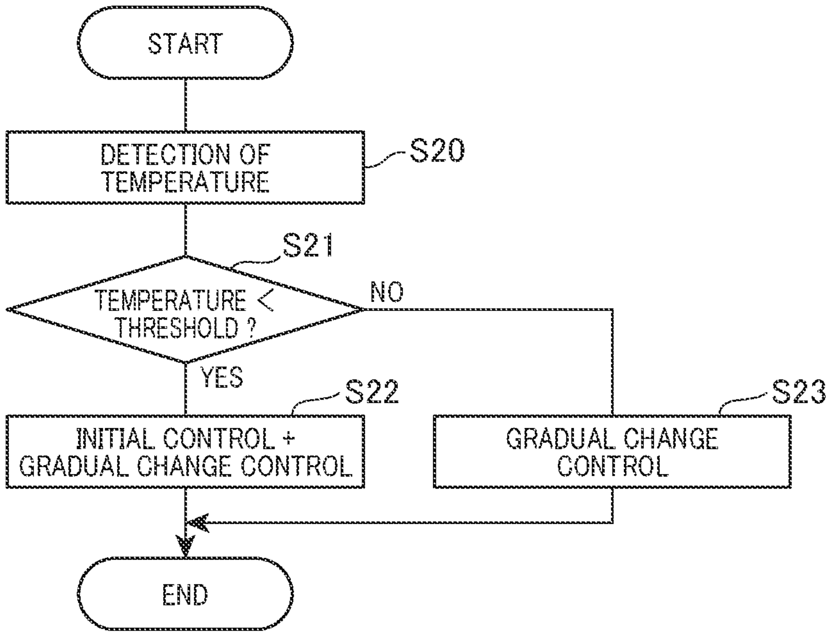
FIG. 17 is a flow chart for illustrating a control process performed at the time of releasing a phase lock in a third embodiment.

In step S20 of FIG. 17, the ECU detects the temperature of the operating oil. The temperature of the operating oil may directly be measured or estimated from the temperature of engine cooling water.

Next, in step S21, the ECU compares the temperature of the operating oil with a prescribed threshold of temperature stored in the ECU. The prescribed threshold of temperature is set in advance according to, for example, an experiment about whether the initial control needs to be performed due to the operating oil having such a temperature as to make the spool 90 have trouble starting to move from the initial state (that is, stroke 0), and the prescribed threshold of temperature is stored in the ECU. The prescribed threshold of temperature is, for example, set to a prescribed temperature in a range of 10 to 20° C. The ECU proceeds to the process in step S22 when determining that the operating oil has a temperature lower than the prescribed threshold of temperature (that is, determined to be YES in step S21).

In step S22, the ECU performs the initial control and subsequently the gradual change control at the time of releasing the phase lock mechanism 2. The energization control performed at this time is substantially identical with the energization control described in the first embodiment with reference to the graph of FIG. 11.

In the third embodiment, the time for performing the initial control (that is, the time from time T1 to time T2 illustrated in FIG. 11) may be changed according to the temperature of the operating oil. Specifically, the ECU prolongs the time for performing the initial control with the decrease in the temperature of the operating oil. The time for performing the initial control is set in a range of, for example, 50 to 300 ms. This setting makes it possible to securely move the spool 90 from the initial position without overly prolonging the time of the initial control.

On the other hand, the ECU proceeds to the process in step S23 when determining in step S21 described above that the operating oil has a temperature higher than the prescribed threshold of temperature (that is, determined to be NO in step S21).

In step S23, the ECU performs, without performing the initial control, the gradual change control at the time of releasing the phase lock mechanism 2. The energization control performed at this time is substantially identical with the energization control described in the second embodiment with reference to the graph of FIG. 16.

The valve timing adjustment system according to the third embodiment described above exhibits the following working effects.

(1) In the third embodiment, the ECU performs the initial control and the gradual change control when the operating oil has a temperature lower than a prescribed threshold of temperature, and the ECU performs, without performing the initial control, the gradual change control when the operating oil has a temperature higher than the prescribed threshold of temperature.

According to this feature, when the operating oil has a high temperature, the spool 90 does not have trouble starting to move in the sleeve 70 and moves along with the increase in the amount of current applied. Therefore, when the operating oil has a temperature higher than the prescribed threshold of temperature, the ECU performs, without performing the initial control, the gradual change control, and thereby it is possible to shorten the time for releasing the phase lock mechanism 2.

(2) In the third embodiment, the ECU prolongs the time for performing the initial control with the decrease in the temperature of the operating oil.

According to this feature, the viscosity of the operating oil is generally changed according to the temperature of the operating oil, and according to the viscosity of the operating oil, the easiness of starting to move of the spool 90 and the lock pin 50 is different. Therefore, by changing the time of the initial control according to the temperature of the operating oil, it is possible to securely release the phase lock mechanism 2 without overly prolonging the time for releasing the phase lock mechanism 2.

Fourth Embodiment

A fourth embodiment is described. In the fourth embodiment, the energization control performed by the ECU at the time of releasing the phase lock mechanism 2 is changed from the first embodiment and the like, and the other features are the same as in the first embodiment and the like. Therefore, only parts different from the parts in the first embodiment and the like are described.

Figure 18:
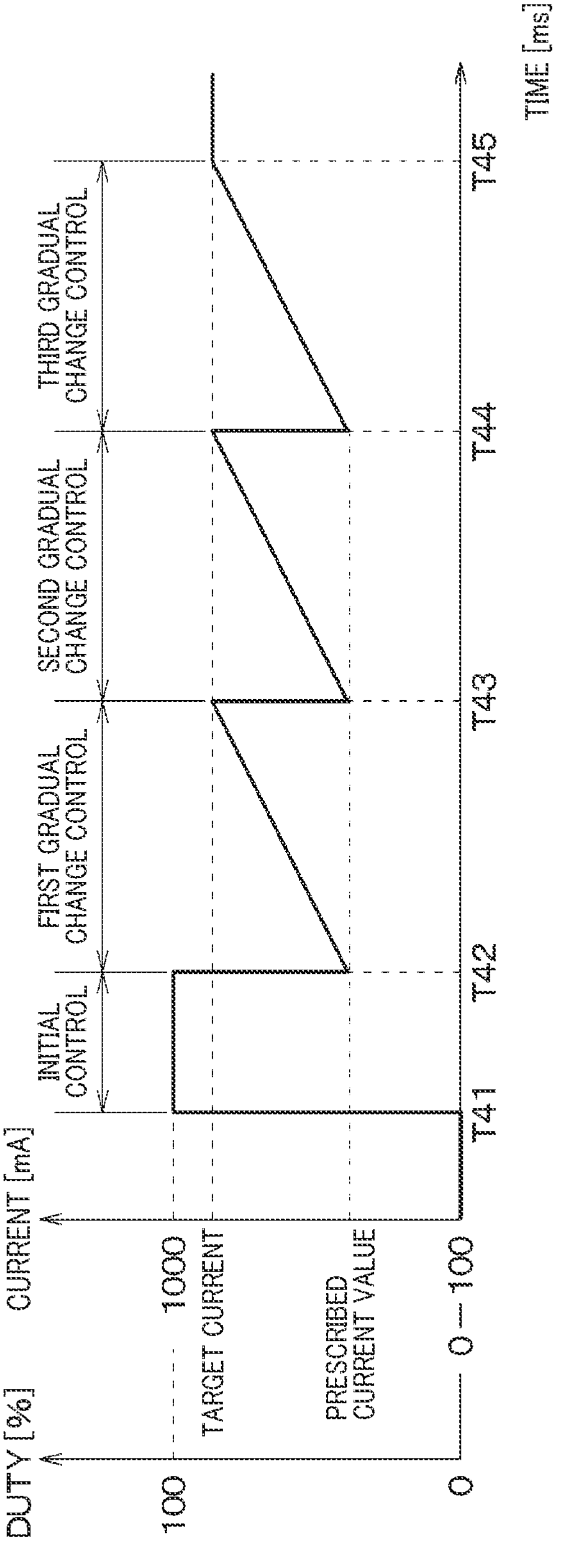
FIG. 18 is a graph illustrating an energization control performed at the time of releasing a phase lock in a fourth embodiment.

Described with reference to a graph of FIG. 18 is an energization control performed by the ECU of the fourth embodiment at the time of releasing the phase lock mechanism 2. The graph of FIG. 18 illustrates a control in which the lock pin 50 is not released in first and second gradual change controls but is released in a third gradual change control.

At time T41 in FIG. 18, the energization control by the ECU for releasing the phase lock mechanism 2 is started. Between time T41 and time 42, the ECU performs an initial control.

Subsequently, between time T42 and time T43, the ECU performs the first gradual change control. Then, the ECU determines whether the lock pin 50 has been released in the process of the first gradual change control. This determination is performed, for example, by comparing a signal input from a crank angle sensor to a signal input from a cam angle sensor and determining whether the vane rotor 30 has started relative rotation with respect to the housing 20. The crank angle sensor is a sensor that detects the rotational angle of the crankshaft 7, and the cam angle sensor is a sensor that detects the rotational angle of the camshaft 8.

The ECU performs the second gradual change control between time T43 and time T44 when determining that the lock pin 50 has not been released by the first gradual change control. Then, the ECU determines whether the lock pin 50 has been released in the process of the second gradual change control.

The ECU performs the third gradual change control between time T44 and time T45 when determining that the lock pin 50 has not been released by the second gradual change control. Then, the ECU determines whether the lock pin 50 has been released in the process of the third gradual change control. The ECU rotates the vane rotor 30 to a target phase when determining that the lock pin 50 has been released by the third gradual change control.

In the fourth embodiment described above, the ECU repetitively performs the gradual change control after the initial control until the tip of the lock pin 50 comes out from the fitting recess 51. This feature makes it possible to securely release the phase lock mechanism 2 and securely relatively rotate the vane rotor 30 and the housing 20 to a prescribed target phase.

In the description of the fourth embodiment, described with reference to the graph of FIG. 18 is a control in which the lock pin 50 is released in the third gradual change control, but the number of the gradual change controls is not limited to three. The ECU determines whether the lock pin 50 has been released in the process of each gradual change control, and when determining that the lock pin 50 has been released, the ECU proceeds to the control of rotating the vane rotor 30 to a target phase without performing the gradual change control thereafter.

Other Embodiments (1) In the embodiments described above, the valve timing adjustment device 1 is described which is disposed at an end of the camshaft 8 that drives the intake valve 14, the valve timing adjustment device adjusting the opening or closing timing of the intake valve 14. The valve timing adjustment device, however, is not limited to this device. The valve timing adjustment device 1 may be disposed at an end of the camshaft 9 that drives the exhaust valve 15, the valve timing adjustment device adjusting the opening or closing timing of the exhaust valve 15. In that case, the fitting phase in which the tip of the lock pin 50 is fitted into the fitting recess 51 is a full advance phase in which the vane rotor 30 is at full advance with respect to the housing 20. When a one-side pressure pin mechanism is used as the phase lock mechanism 2, the release hydraulic chamber 52 thereof is configured to be in communication with the retard hydraulic chamber 41 via an oil passage. Further, the hydraulic control valve 3 is configured to supply the operating oil and the hydraulic pressure to the advance hydraulic chamber 40 and discharge the operating oil from the retard hydraulic chamber 41 at zero stroke (that is, the initial position) with a duty cycle of 0%. In addition, the hydraulic control valve 3 is configured to supply the hydraulic pressure to the retard hydraulic chamber 41 and discharge the operating oil from the advance hydraulic chamber 40 at full stroke (that is, the maximum movement position) with a duty cycle of 100%. Thus, the valve timing adjustment system can be applied either for the intake valve 14 or the exhaust valve 15.

(2) In the embodiments described above, the hydraulic control valve 3 is configured to be disposed in a central portion of the valve timing adjustment device 1, but the position of the hydraulic control valve is not limited to this position. The hydraulic control valve 3 may be disposed at a position other than in the valve timing adjustment device 1.

(3) In the embodiments described above, the hydraulic control valve 3 and the electromagnetic drive section 4 are configured to be different members, but are not limited to this configuration. The hydraulic control valve 3 and the electromagnetic drive section 4 may be integrally formed.

(4) In the embodiments described above, described is the torque transmission system of the internal combustion engine 6 that performs torque transmission between a drive shaft and driven shafts by the chain 13 wound around the gear 10 fixed to the drive shaft and the gears 11, 12 fixed to the driven shafts. The torque transmission system, however, is not limited to this system. The torque transmission system may be configured to perform torque transmission between a drive shaft and driven shafts by a belt wound around a pulley fixed to the drive shaft and pulleys fixed to the driven shafts.

(5) In the embodiments described above, described is the one-side pressure pin mechanism employed as the phase lock mechanism 2. The phase lock mechanism 2, however, is not limited to the one-side pressure pin mechanism. As the phase lock mechanism 2, a so-called double-side pressure pin mechanism may be employed in which a plurality of release hydraulic chambers are formed around the lock pin 50, one of the release hydraulic chambers is in communication with the advance hydraulic chamber 40 via an oil passage, and another release hydraulic chamber is in communication with the retard hydraulic chamber 41 via an oil passage.

(6) The embodiments described above are not unrelated with each other and can be combined as appropriate except for combinations that are apparently impossible. For example, the second embodiment may be combined with the third embodiment. In that case, the ECU performs the initial control and the gradual change control when the viscosity of a type of oil used as the operating oil is higher than a prescribed threshold of viscosity for types of oil and the operating oil has a temperature lower than a prescribed threshold of temperature. On the other hand, the ECU performs, without performing the initial control, the gradual change control when the viscosity of a type of oil used as the operating oil is lower than the prescribed threshold of viscosity for types of oil or the operating oil has a temperature higher than the prescribed threshold of temperature. The present disclosure is not limited to the embodiments described above, and can be changed as appropriate.

Even when the embodiments described above refer to the number of constituent elements of the embodiments, the numerical values, the amounts, and the numerical values of ranges and the like, those referred to are not limited to the numbers specified therein except for, for example, the cases in which the numbers referred to are particularly mentioned to be essential and the cases in which the numbers referred to are in principle clearly limited to the numbers specified.

In addition, needless to say, the elements constituting the embodiments are not always essential in the embodiments described above except for, for example, the cases in which the elements are particularly mentioned to be essential and the cases in which the elements are considered to be clearly essential in principle.

Further, even when the embodiments described above refer to the shape, the positional relationship, and the like of the constituent elements and the like, those referred to are not limited to the shape, the positional relationship, and the like specified therein except for, for example, the cases in which those referred to are particularly mentioned and the cases in which those referred to are, in principle, limited to the shape, the positional relationship, and the like.

The control section and the method thereof described in the present disclosure may be achieved by a dedicated computer provided so as to include a processor, which is programmed to perform one or a plurality of functions embodied by a computer program, and a memory. Alternatively, the control section and the method thereof described in the present disclosure may be achieved by a dedicated computer provided so as to include a processor formed of one or more dedicated hardware logic circuits. Alternatively, the control section and the method thereof described in the present disclosure may be achieved by one or more dedicated computers configured to include a combination of a processor, which is programmed to perform one or a plurality of functions, and a memory, with a processor formed of one or more hardware logic circuits. The computer program may be, as an instruction to be performed by a computer, stored in a computer-readable non-transitory tangible recording medium.

Conclusion

The present disclosure improves, by securely releasing a phase lock mechanism in a short time, the activation of a valve timing adjustment system when a phase control is performed from a phase-locked state.

According to one aspect of the present disclosure, a valve timing adjustment system is disposed in a torque transmission system for transmitting torque from a drive shaft of an internal combustion engine to a driven shaft and adjusts opening or closing timing of an intake valve or an exhaust valve driven to be open or closed by rotation of the driven shaft, and the valve timing adjustment system includes a valve timing adjustment device, a phase lock mechanism, a hydraulic control valve, an electromagnetic drive section, and an electronic control device.

The valve timing adjustment device includes a housing that rotates together with the drive shaft, and a vane rotor that partitions a hydraulic chamber formed in the housing into an advance hydraulic chamber and a retard hydraulic chamber, and that rotates together with the driven shaft, the housing and the vane rotor being configured to have a relative rotational phase thereof controlled by hydraulic pressure supplied to the advance hydraulic chamber and the retard hydraulic chamber.

The phase lock mechanism is configured to include a lock pin disposed in a receiving hole of the vane rotor in a reciprocable manner, a fitting recess disposed in the housing such that a tip of the lock pin can be fitted into the fitting recess when the vane rotor and the housing are located in a prescribed phase, and a release hydraulic chamber that is in communication with at least one of the advance hydraulic chamber or the retard hydraulic chamber, and applies hydraulic pressure to the lock pin in a direction of the lock pin coming out from the fitting recess.

The hydraulic control valve includes a sleeve and a spool and controls the hydraulic pressure and an amount of operating oil supplied to the advance hydraulic chamber and the retard hydraulic chamber, the sleeve including a plurality of ports in communication with the advance hydraulic chamber and the retard hydraulic chamber respectively via oil passages, and the spool being disposed in the sleeve in a reciprocable manner and capable of adjusting an opening area of the plurality of ports according to a change of a position in a shaft direction of the spool.

The electromagnetic drive section is configured to be driven according to an amount of current applied thereto to apply load to the spool, and thus capable of changing the position in the shaft direction of the spool.

The electronic control device controls the current applied to the electromagnetic drive section. The electronic control device is configured to, when the lock pin having the tip thereof fitted into the fitting recess is removed from the fitting recess, perform an initial control of applying current to the electromagnetic drive section at a prescribed current value for a prescribed time to move the spool from an initial position, and then perform a gradual change control of applying current to the electromagnetic drive section while gradually increasing the current value from a current value smaller than the prescribed current value applied in the initial control but greater than 0, to remove the lock pin from the fitting recess.

According to this feature, large load is, by the initial control, instantaneously applied from the electromagnetic drive section to the spool, and the spool can thereby be securely moved from the initial position and changed into an easily slidable state even when the operating oil has a high viscosity. Therefore, by the gradual change control following the initial control, it is possible to gradually move the spool along with the increase in the amount of current applied and securely release the phase lock mechanism. That is, the "prescribed current value" applied when the initial control is performed may be any current value as long as the spool can be moved from the initial position even when the operating oil has a high viscosity.

Further, by the gradual change control in which the current value is not increased from 0 but is gradually increased from a current value greater than 0, a region in which the hydraulic pressure is suddenly and greatly supplied to one of the advance hydraulic chamber or the retard hydraulic chamber, that is, a region unnecessary for releasing the phase lock mechanism is removed. Therefore, it is possible to prevent the tip of the lock pin from from becoming stuck to the inner wall of the fitting recess, and shorten the time for releasing the phase lock mechanism. Accordingly, this valve timing adjustment system can improve the activation thereof by being capable of releasing the phase-locked state of the valve timing adjustment device in a short time and controlling the phase of the valve timing adjustment device, for example, even when the operating oil has a high viscosity.

In the present description, the "current value greater than 0" means a current value greater than 0 mA or a current value greater than a duty cycle of 0% (for example, a prescribed value in a current value between 0 mA and 100 mA).

Another aspect relates to an electronic control device that controls drive of the valve timing adjustment system. The valve timing adjustment system includes the valve timing adjustment device, the phase lock mechanism, the hydraulic control valve, and the electromagnetic drive section that are described in the one aspect above. The electronic control device is configured to, when the lock pin having the tip thereof fitted into the fitting recess is removed from the fitting recess, perform an initial control of applying current to the electromagnetic drive section at a prescribed current value for a prescribed time to move the spool from an initial position, and then perform a gradual change control of applying current to the electromagnetic drive section while gradually increasing the current value from a current value smaller than the prescribed current value applied in the initial control but greater than 0, to remove the lock pin from the fitting recess.

With this feature, the disclosure of this other aspect can also exhibit the identical working effects with the working effects of the disclosure of the one aspect. The disclosure of the other aspect can be used as disclosure dependent on the disclosure of the one aspect.

What is claimed is:

1. A valve timing adjustment system that is disposed in a torque transmission system for transmitting torque from a drive shaft of an internal combustion engine to a driven shaft and adjusts opening or closing timing of an intake valve or an exhaust valve driven to be open or closed by rotation of the driven shaft, the valve timing adjustment system comprising:

a valve timing adjustment device including a housing that rotates together with the drive shaft, and a vane rotor that partitions a hydraulic chamber formed in the housing into an advance hydraulic chamber and a retard hydraulic chamber, and that rotates together with the driven shaft, the housing and the vane rotor having a relative rotational phase thereof controlled by hydraulic pressure supplied to the advance hydraulic chamber and the retard hydraulic chamber;

a phase lock mechanism including a lock pin disposed in a receiving hole of the vane rotor in a reciprocable manner, a fitting recess disposed in the housing such that a tip of the lock pin can be fitted into the fitting recess when the vane rotor and the housing are located in a prescribed phase, and a release hydraulic chamber that is in communication with at least one of the advance hydraulic chamber or the retard hydraulic chamber, and applies hydraulic pressure to the lock pin in a direction detaching the lock pin from the fitting recess;

a hydraulic control valve including a sleeve and a spool, and controlling the hydraulic pressure and an amount of operating oil supplied to the advance hydraulic chamber and the retard hydraulic chamber, the sleeve including a plurality of ports in communication with the advance hydraulic chamber and the retard hydraulic chamber respectively via oil passages, and the spool being disposed in the sleeve in a reciprocable manner and capable of adjusting an opening area of the plurality of ports according to a change of a position in a shaft direction of the spool;

an electromagnetic drive section that is driven according to an amount of current applied thereto to apply load to the spool, and thus capable of changing the position in the shaft direction of the spool; and an electronic control device that controls the current applied to the electromagnetic drive section, the electronic control device being configured to, when the lock pin having the tip thereof fitted into the fitting recess is removed from the fitting recess, perform an initial control of applying current to the electromagnetic drive section at a prescribed current value for a prescribed time to move the spool from an initial position, and then perform a change control of applying current to the electromagnetic drive section while increasing a current value from a current value smaller than the prescribed current value applied in the initial control but greater than 0, to remove the lock pin from the fitting recess, wherein the electronic control device controls by PWM control the current applied to the electromagnetic drive section, the electromagnetic drive section is configured to move the spool from the initial position toward a maximum movement position as a duty cycle gets closer to 100% in the PWM control by the electronic control device, and thus to increase the hydraulic pressure and the amount of the operating oil supplied to the one hydraulic chamber having the hydraulic pressure thereof increased when the vane rotor and the housing are relatively rotated toward the non-fitting phase farthest from the fitting phase in which the lock pin is fitted into the fitting recess, and the prescribed current value applied when the electronic control device performs the initial control is a prescribed value with a duty cycle between 100 and 95%.

2. The valve timing adjustment system according to claim 1, wherein the release hydraulic chamber of the phase lock mechanism is configured to be, via an oil passage, in communication with one hydraulic chamber, of the advance hydraulic chamber and the retard hydraulic chamber, having hydraulic pressure thereof increased when the vane rotor and the housing are relatively rotated toward a non-fitting phase that is farthest from a fitting phase in which the lock pin is fitted into the fitting recess, but to be, via an oil passage, in non-communication with the other hydraulic chamber having hydraulic pressure thereof increased when the vane rotor and the housing are relatively rotated to the fitting phase.

3. The valve timing adjustment system according to claim 1 wherein when, in an energization control by the electronic control device, referred to as a holding current value is a current value for driving the electromagnetic drive section so as to move the spool to a position in which an amount of hydraulic pressure discharged from the advance hydraulic chamber and the retard hydraulic chamber is 0, a current value applied when the electronic control device starts the change control is a prescribed current value in a range of the holding current value.

4. The valve timing adjustment system according to claim 1, wherein when, in an energization control by the electronic control device, referred to as a holding current value is a current value for driving the electromagnetic drive section so as to move the spool to a position in which an amount of hydraulic pressure discharged from the advance hydraulic chamber and the retard hydraulic chamber is 0, a current value applied when the electronic control device starts the change control is a prescribed current value in a range smaller than the holding current value but greater than 0.

5. The valve timing adjustment system according to claim 1, wherein a current value applied when the electronic control device starts the change control is a prescribed current value with a duty cycle between 20 and 50%.

6. The valve timing adjustment system according to claim 1, wherein a current value applied when the electronic control device starts the change control is a prescribed current value between 200 mA and 500 mA.

7. The valve timing adjustment system according to claim 1, wherein when, in an energization control by the electronic control device, referred to as a holding current value is a current value for driving the electromagnetic drive section so as to move the spool to a position in which an amount of hydraulic pressure discharged from the advance hydraulic chamber and the retard hydraulic chamber is 0, a current value applied when the electronic control device starts the change control is a prescribed current value in a range of the holding current value or a prescribed current value in a range smaller than the holding current value but greater than 0, and a current value applied when the electronic control device ends the change control is a current value greater than the holding current value.

8. The valve timing adjustment system according to claim 1, wherein the electronic control device is configured to perform the initial control and the change control when the operating oil has a viscosity higher than a prescribed threshold of viscosity, and to perform, without performing the initial control, the change control when the operating oil has a viscosity lower than the prescribed threshold of viscosity.

9. The valve timing adjustment system according to claim 1, wherein the electronic control device is configured to perform the initial control and the change control when the operating oil has a temperature lower than a prescribed threshold of temperature, and to perform, without performing the initial control, the change control when the operating oil has a temperature higher than the prescribed threshold of temperature.

10. The valve timing adjustment system according to claim 1, wherein the electronic control device is configured to prolong a time for performing the initial control with an increase in the viscosity of the operating oil.

11. The valve timing adjustment system according to claim 1, wherein the electronic control device is configured to prolong a time for performing the initial control with a decrease in the temperature of the operating oil.

12. The valve timing adjustment system according to claim 1, wherein the fitting phase in which the tip of the lock pin is fitted into the fitting recess is a full advance phase in which the vane rotor is at full advance with respect the housing, or a full retarded phase in which the vane rotor is at full retard with respect to the housing.

13. The valve timing adjustment system according to claim 1, wherein the electronic control device performs the initial control, and then repetitively performs the change control until the tip of the lock pin comes out from the fitting recess.

14. An electronic control device controlling drive of a valve timing adjustment system that is disposed in a torque transmission system for transmitting torque from a drive shaft of an internal combustion engine to a driven shaft and adjusts opening or closing timing of an intake valve or an exhaust valve driven to be open or closed by rotation of the driven shaft, the valve timing adjustment system including:

a valve timing adjustment device including a housing that rotates together with the drive shaft, and a vane rotor that partitions a hydraulic chamber formed in the housing into an advance hydraulic chamber and a retard hydraulic chamber, and that rotates together with the driven shaft, the housing and the vane rotor having a relative rotational phase thereof controlled by hydraulic pressure supplied to the advance hydraulic chamber and the retard hydraulic chamber;

a phase lock mechanism including a lock pin disposed in a receiving hole of the vane rotor in a reciprocable manner, a fitting recess disposed in the housing such that a tip of the lock pin can be fitted into the fitting recess when the vane rotor and the housing are located in a prescribed phase, and a release hydraulic chamber that is in communication with at least one of the advance hydraulic chamber or the retard hydraulic chamber, and applies hydraulic pressure to the lock pin in a direction of the lock pin coming out from the fitting recess;

a hydraulic control valve including a sleeve and a spool, and controlling the hydraulic pressure and an amount of operating oil supplied to the advance hydraulic chamber and the retard hydraulic chamber, the sleeve including a plurality of ports in communication with the advance hydraulic chamber and the retard hydraulic chamber respectively via oil passages, and the spool being disposed in the sleeve in a reciprocable manner and capable of adjusting an opening area of the plurality of ports according to a change of a position in a shaft direction of the spool; and an electromagnetic drive section that is driven according to an amount of current applied thereto to apply load to the spool, and thus capable of changing the position in the shaft direction of the spool, the electronic control device being configured to, when the lock pin having the tip thereof fitted into the fitting recess is removed from the fitting recess, perform an initial control of applying current to the electromagnetic drive section at a prescribed current value for a prescribed time to move the spool from an initial position, and then perform a change control of applying current to the electromagnetic drive section while increasing a current value from a current value smaller than the prescribed current value applied in the initial control but greater than 0, to remove the lock pin from the fitting recess, wherein the electronic control device controls by PWM control the current applied to the electromagnetic drive section, the electromagnetic drive section is configured to move the spool from the initial position toward a maximum movement position as a duty cycle gets closer to 100% in the PWM control by the electronic control device, and thus to increase the hydraulic pressure and the amount of the operating oil supplied to the one hydraulic chamber having the hydraulic pressure thereof increased when the vane rotor and the housing are relatively rotated toward the non-fitting phase farthest from the fitting phase in which the lock pin is fitted into the fitting recess, and the prescribed current value applied when the electronic control device performs the initial control is a prescribed value with a duty cycle between 100 and 95%.

* * * * *